United States Patent
Smith et al.

(10) Patent No.: US 12,481,162 B1
(45) Date of Patent: Nov. 25, 2025

(54) GUIDANCE SYSTEM FOR HEAD-MOUNTED DISPLAYS

(71) Applicant: META PLATFORMS, INC., Menlo Park, CA (US)

(72) Inventors: Clinton Smith, Kirkland, WA (US); Samuel Pepperwood, Portland, OR (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 862 days.

(21) Appl. No.: 17/686,626

(22) Filed: Mar. 4, 2022

(51) Int. Cl.
*G03B 13/32* (2021.01)
*G02B 27/00* (2006.01)
*G02B 27/01* (2006.01)
*G06F 3/01* (2006.01)

(52) U.S. Cl.
CPC ..... *G02B 27/0176* (2013.01); *G02B 27/0093* (2013.01); *G02B 27/0172* (2013.01); *G06F 3/012* (2013.01); *G06F 3/013* (2013.01); *G02B 2027/011* (2013.01); *G02B 2027/0138* (2013.01); *G02B 2027/014* (2013.01)

(58) Field of Classification Search
CPC ............ G02B 27/0176; G02B 27/0093; G02B 27/0172; G02B 2027/011; G02B 2027/0138; G02B 2027/014; G06F 3/012; G06F 3/013

USPC .......................................................... 351/57
See application file for complete search history.

(56) References Cited

U.S. PATENT DOCUMENTS

| | | |
|---|---|---|
| 8,086,099 B2 | 12/2011 | Schworm et al. |
| 8,888,643 B2 | 11/2014 | Lohr et al. |
| 9,273,766 B2 | 3/2016 | Shimizu |
| 10,901,172 B2 | 1/2021 | Choi et al. |
| 10,915,162 B2 | 2/2021 | Ebert et al. |
| 11,042,187 B1 | 6/2021 | Fang et al. |
| 2012/0237147 A1 | 9/2012 | Utz |

*Primary Examiner* — Bumsuk Won
*Assistant Examiner* — Grant A Gagnon
(74) *Attorney, Agent, or Firm* — Greenberg Traurig, LLP

(57) ABSTRACT

In some embodiments, a head-mounted display device includes an optics block and a varifocal actuation system coupled to the optics block. The varifocal actuation system utilizes at least one of a tandem retaining configuration, a tandem guidance system, and a tandem preload configuration to minimize parasitic motion errors associated with the head-mounted display device. In some embodiments, the tandem retaining configuration includes a hooking structure or a washer-based structure, the tandem guidance system includes an anti-creep system, and the tandem preload configuration includes a preload magnet and a preload target.

18 Claims, 16 Drawing Sheets

GUIDANCE SYSTEM FOR HEAD-MOUNTED DISPLAYS

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Head-mounted displays (HMDs) have gained popularity as a mechanism to provide visual information to a user. Virtual reality HMDs simulate virtual environments and augmented reality HMDs present virtual images overlapping with a real-world view. Both systems generally require stereoscopic images displayed on a display of the HMD to illustrate an illusion of depth. Conventional HMDs are often unable to compensate for vergence and accommodation conflicts when rendering content, which may cause visual fatigue and nausea in users of the HMDs.

DETAILED DESCRIPTION

Figure 1:
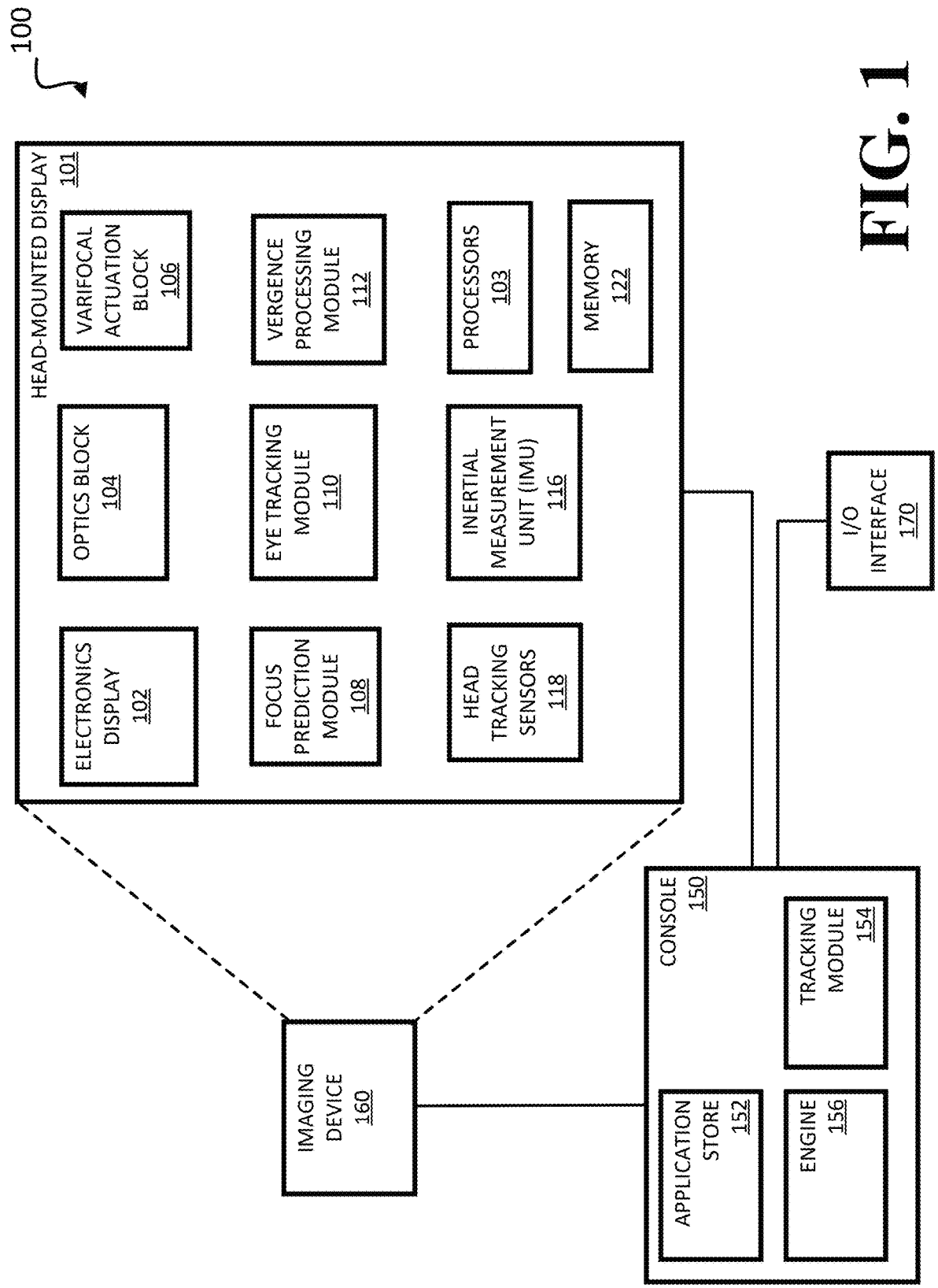
FIG. 1 is a block diagram illustrating a system in accordance with some embodiments.

FIG. 1 illustrates a system 100 in which a head-mounted display (HMD) 101 operates. System 100 may be a varifocal system that is used as a virtual reality (VR) system, an augmented reality (AR) system, a mixed reality (MR) system, or some combination thereof. In some embodiments, the system 100 includes HMD 101, imaging device 160, and input/output (I/O) interface 170, which are each coupled to console 150. While FIG. 1 shows a single HMD 101, a single imaging device 160, and a single I/O interface 170, in other embodiments, any number of these components may be included in the system. For example, there may be multiple HMDs each having an associated I/O interface 170 and being monitored by one or more imaging devices 160, with each HMD 101, I/O interface 170, and imaging devices 160 communicating with the console 150. In alternative configurations, different and/or additional components may also be included in the system environment.

In some embodiments, HMD 101 presents content to a user which may include, for example, images, video, audio, or some combination thereof. Audio content may be presented via a separate device (e.g., speakers and/or headphones) external to HMD 101 that receives audio information from HMD 101, console 150, or both. HMD 101 includes one or more of the following: electronic display 102, optics block 104, varifocal actuation block 106, focus prediction module 108, eye tracking module 110, inertial measurement unit (IMU) 116, head tracking sensors 118, processors 103, and memory 122.

In some embodiments, optics block 104 directs light from electronic display 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by optics block 104 allows electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view. The optics block 104 can be a single lens or a system of lenses, such as a pancake lens.

In some embodiments, optics block 104 may be designed to correct one or more optical errors. Examples of optical errors include: barrel distortion, pincushion distortion, longitudinal chromatic aberration, transverse chromatic aberration, spherical aberration, chromatic aberration, field curvature, astigmatism, and so forth. In some embodiments, content provided to electronic display 102 for display is pre-distorted, and optics block 104 corrects the distortion when it receives image light from electronic display 102 generated based on the content.

In some embodiments, varifocal actuation block 106 causes optics block 104 to vary the focal distance of HMD 101 to keep a user's eyes in a zone of comfort as vergence and accommodation change. In some embodiments, varifocal actuation block 106 physically changes the distance between electronic display 102 and optical block 104 by moving electronic display 102 or optical block 104 (or both), using, for example, the guidance system described herein. In some embodiments, varifocal actuation block 106 may include actuators or motors that move electronic display 102 and/or optical block 104 to change the distance between them. Varifocal actuation block 106 may be separate from or integrated into optics block 104 in various embodiments.

In some embodiments, focus prediction module 108 is an encoder or encoders that include logic that tracks the position or state of optics block 104 to predict to one or more future states or locations of optics block 104. For example, focus prediction module 108 accumulates historical information corresponding to previous states of optics block 104 and predicts a future state of optics block 104 based on the previous states.

In some embodiments, eye tracking module 110 tracks an eye position and eye movement of a user of HMD 101. A camera or other optical sensor inside HMD 101 captures image information of a user's eyes, and eye tracking module 110 uses the captured information to determine interpupillary distance, interocular distance, a three-dimensional (3D) position of each eye relative to HMD 101 (e.g., for distortion adjustment purposes), including a magnitude of torsion and rotation (i.e., roll, pitch, and yaw) and gaze directions for each eye. Many methods for tracking the eyes of a user can be used by eye tracking module 110.

In some embodiments, IMU 116 is an electronic device that generates calibration data based on measurement signals received from one or more of head tracking sensors 118, which generate one or more measurement signals in response to motion of HMD 101. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

In some embodiments, one or more processors 103 (e.g., processing units or cores) execute instructions stored in memory 122. Memory 122 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 122, or alternately the non-volatile memory device(s) within memory 122, includes a non-transitory computer readable storage medium. In some embodiments, memory 122 or the computer readable storage medium of memory 122 stores programs, modules and data structures, and/or instructions for displaying one or more images on display 102.

In some embodiments, I/O interface 170 is a device that allows a user to send action requests to console 150. An action request is a request to perform a particular action. For example, an action request may be to start or end an application or to perform a particular action within the application. I/O interface 170 may include one or more input devices. Example input devices include a keyboard, a mouse, a game controller, or any other suitable device for receiving action requests and communicating the received action requests to console 150. An action request received by I/O interface 170 is communicated to console 150, which performs an action corresponding to the action request. In some embodiments, I/O interface 170 may provide haptic feedback to the user in accordance with instructions received from console 150. For example, haptic feedback is provided by the I/O interface 170 when an action request is received, or console 150 communicates instructions to I/O interface 170 causing I/O interface 170 to generate haptic feedback when console 150 performs an action.

In some embodiments, console 150 provides content to HMD 101 for presentation to the user in accordance with information received from imaging device 160, HMD 101, or I/O interface 170. In the example shown in FIG. 1, console 150 includes application store 152, tracking module 154, and engine 156. Some embodiments of console 150 have different or additional modules than those described in conjunction with FIG. 1. Similarly, the functions further described below may be distributed among components of console 150 in a different manner than is described here.

In some embodiments, application store 152 stores one or more applications for execution by console 150. In some embodiments, an application is a group of instructions, that when executed by a processor, generates content for presentation to the user. Content generated by an application may be in response to inputs received from the user via movement of HMD 101 or interface 170. Examples of applications include gaming applications, conferencing applications, video playback application, or other suitable applications.

Tracking module 154 calibrates system 100 using one or more calibration parameters and may adjust one or more calibration parameters to reduce error in determining position of HMD 101.

In some embodiments, engine 156 executes applications within the system and receives position information, acceleration information, velocity information, predicted future positions, or some combination thereof for HMD 101 from tracking module 154. Based on the received information, engine 156 determines content to provide to HMD 101 for presentation to the user, such as a virtual scene.

In some embodiments, vergence processing module 112 determines a vergence depth of a user's gaze based on the gaze point or an estimated intersection of the gaze lines determined by eye tracking module 110. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, vergence processing module 112 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

In some embodiments, a HMD, such as HMD 101, (or a near-eye display) uses a guidance system as described herein to dynamically adjust a location of an image plane (e.g, to address vergence-accommodation conflict). In some embodiments, the guidance system is configured to adjust a location of one or more moveable elements (e.g., electronic display 102 and/or one or more optical elements) of optics block 104 to control a location of an image plane. As used herein, a moveable element is an element whose movement corresponds to a change in location of the image plane. In some embodiments, for example, in the case of a pancake lens assembly, the guidance system may be configured to move one or all of the optical elements of the pancake lens and/or the electronic display 102 to change the location of the image plane.

Figure 2:
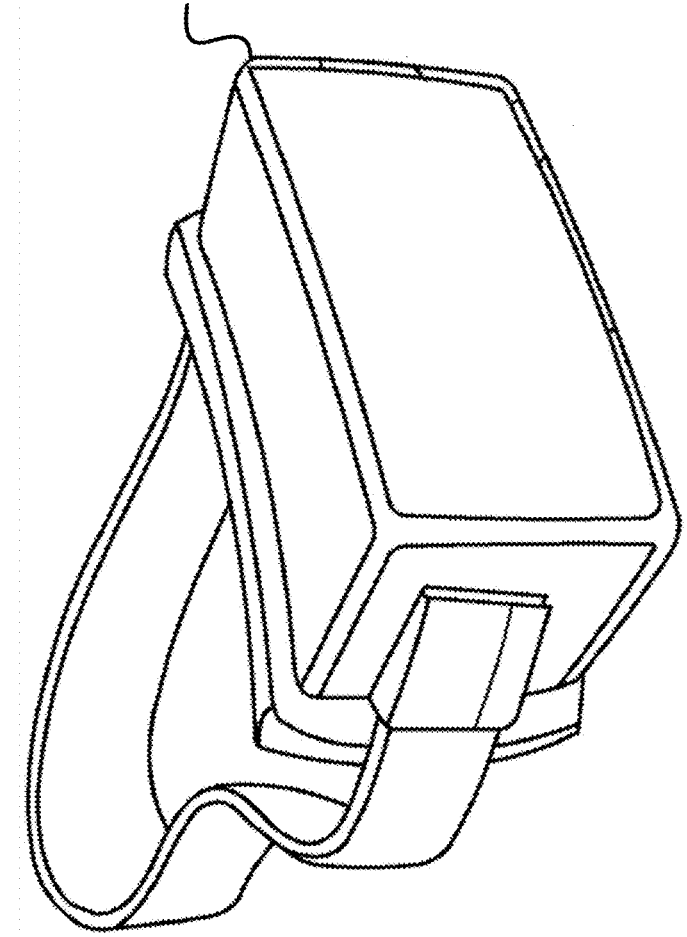
FIG. 2 illustrates a head-mounted display in accordance with some embodiments.

FIG. 2 illustrates a diagram of HMD 101, in accordance with at least one embodiment. In some embodiments, HMD 101 includes the guidance system described herein. In some embodiments, HMD 101 includes a front rigid body and a band that goes around a user's head. The front rigid body includes the varifocal actuation block 106 that includes the guidance system, as well as one or more electronic display elements corresponding to electronic display 102, IMU 116, and head tracking sensors 118. In this example, head tracking sensors 118 are located within IMU 116. Note in some embodiments, where the HMD 101 is used in AR and/or MR applications portions of the HMD 101 may be at least partially transparent (e.g., an internal electronic display, one or more sides of the HMD 101, etc.).

Figure 3A:
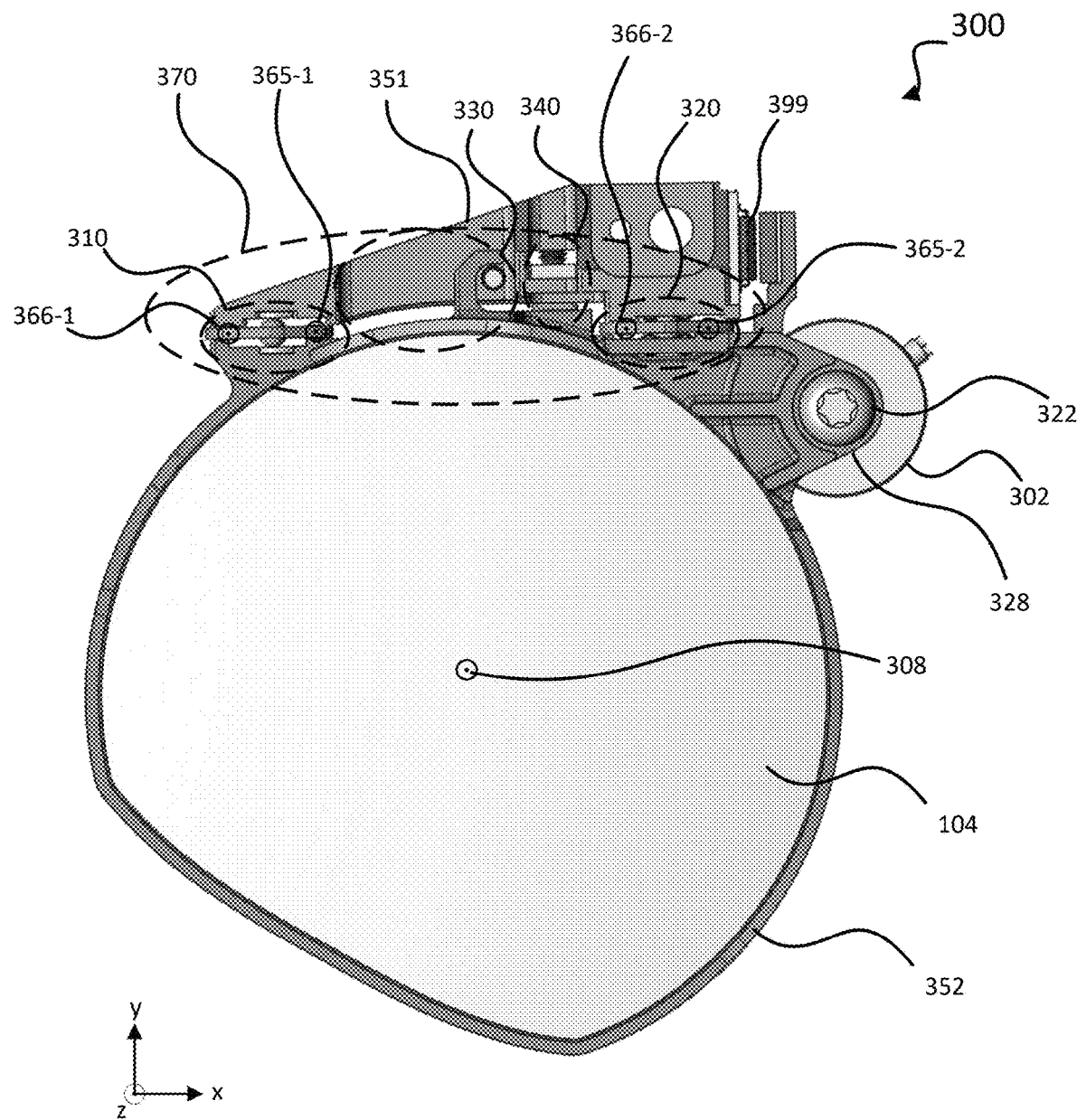
FIG. 3A illustrates a guidance system utilized in the head-mounted display of FIG. 1 in accordance with some embodiments.

FIG. 3A illustrates a diagram of a guidance system 300 utilized in HMD 101 in accordance with some embodiments. In some embodiments, guidance system 300 includes an actuator 302 (e.g., a voice coil actuator, stepper motor, brushless DC motor, etc.), an encoder 399, a movable carriage 352, and a fixed carriage 351. In some embodiments, the fixed carriage 351 is configured to serve as, for example, a fixed base for the guidance system 300. In some embodiments, the movable carriage 352 is configured to work in tandem with the fixed carriage 351, the encoder 399, and the actuator 302 to guide the movement of optics block 104 (or the electronic display 102) along an optical axis 308. In some embodiments, the guidance system 300 is configured to adjust a location of the optics block 104 to control a location of an image plane in the HMD 101.

Figure 3B:
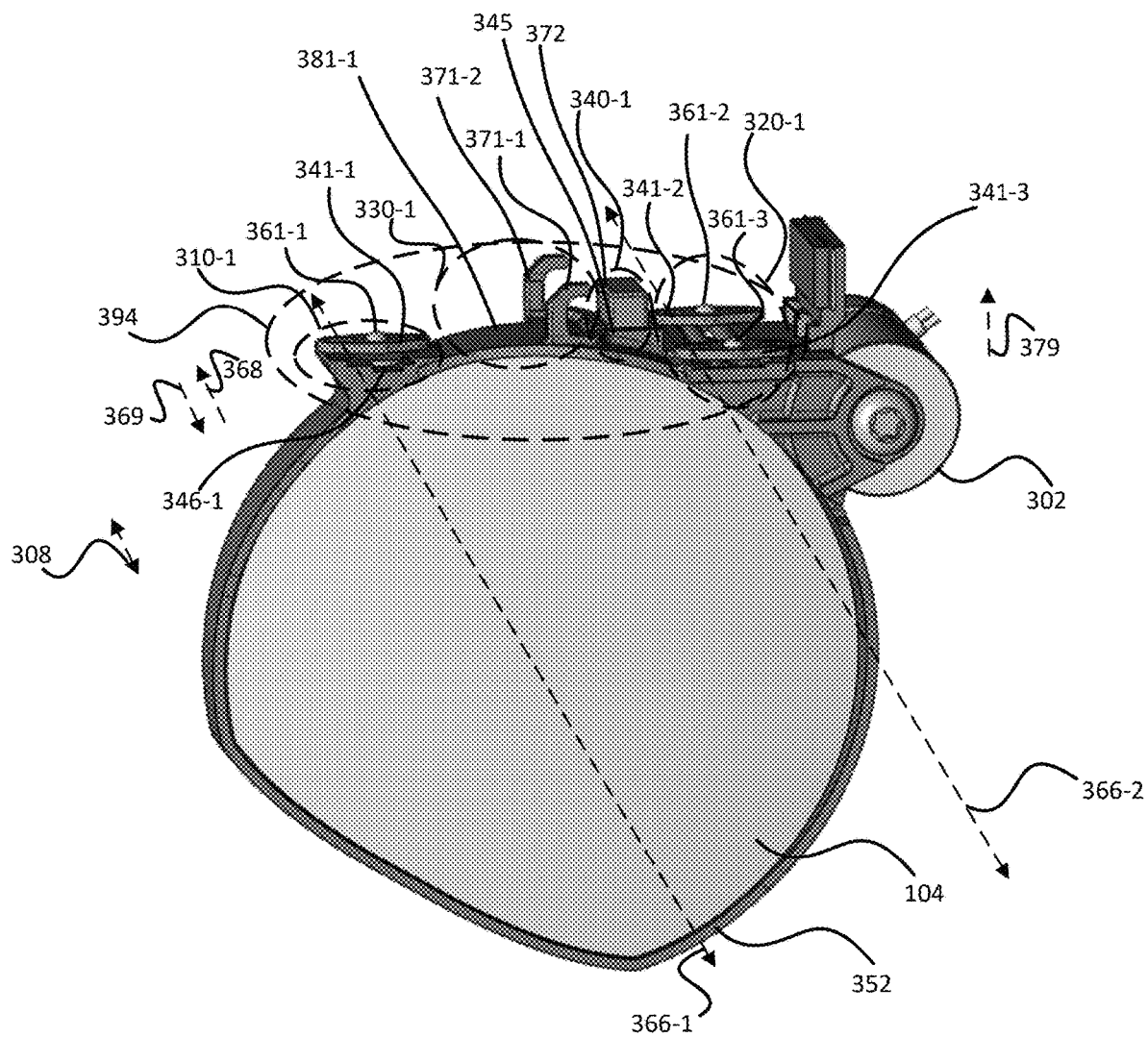
FIG. 3B illustrates a movable carriage of the guidance system of FIG. 3A in accordance with some embodiments.
Figure 3C:
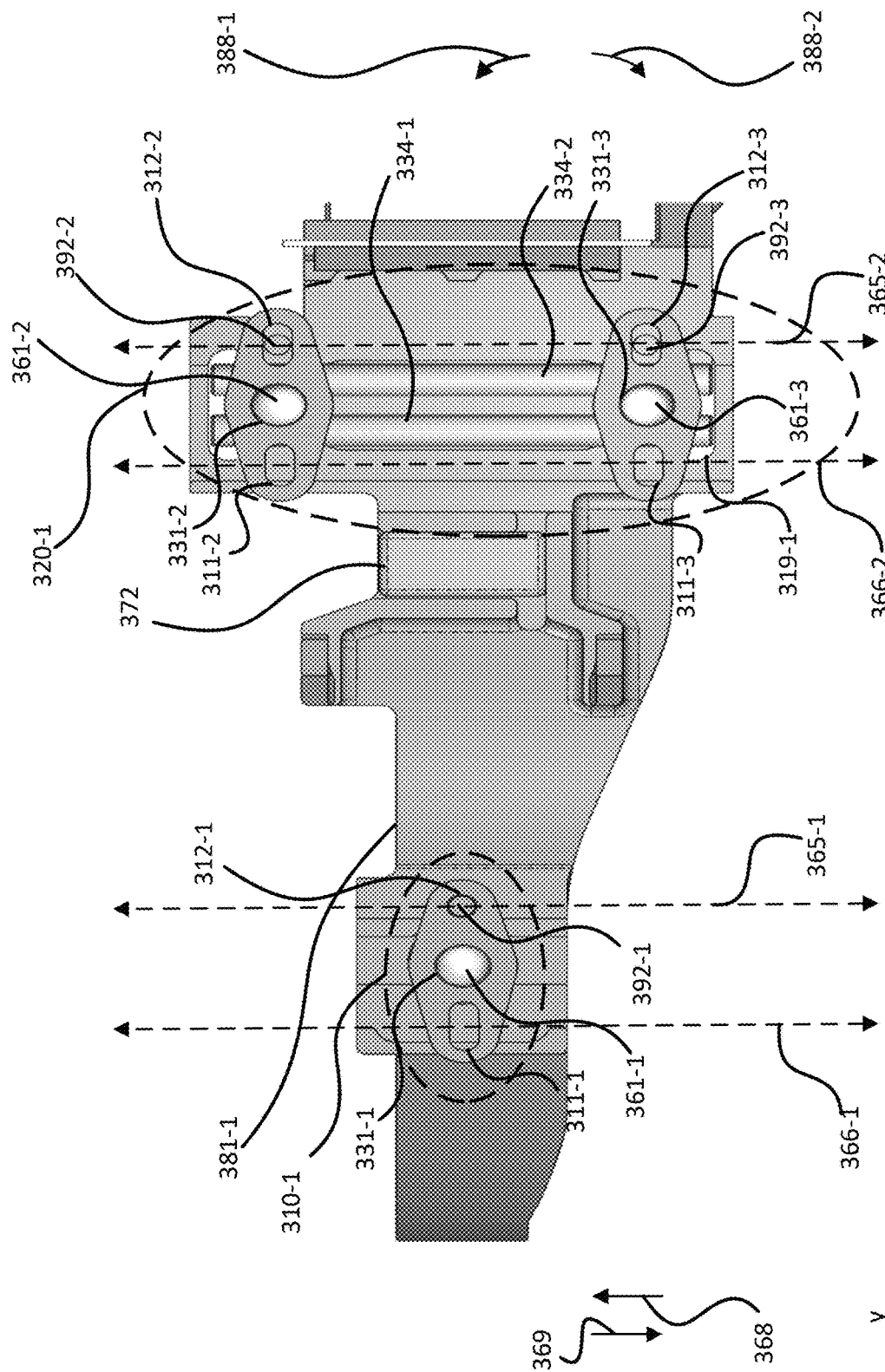
FIG. 3C illustrates a top view of the movable carriage of FIG. 3B in accordance with some embodiments.
Figure 3D:
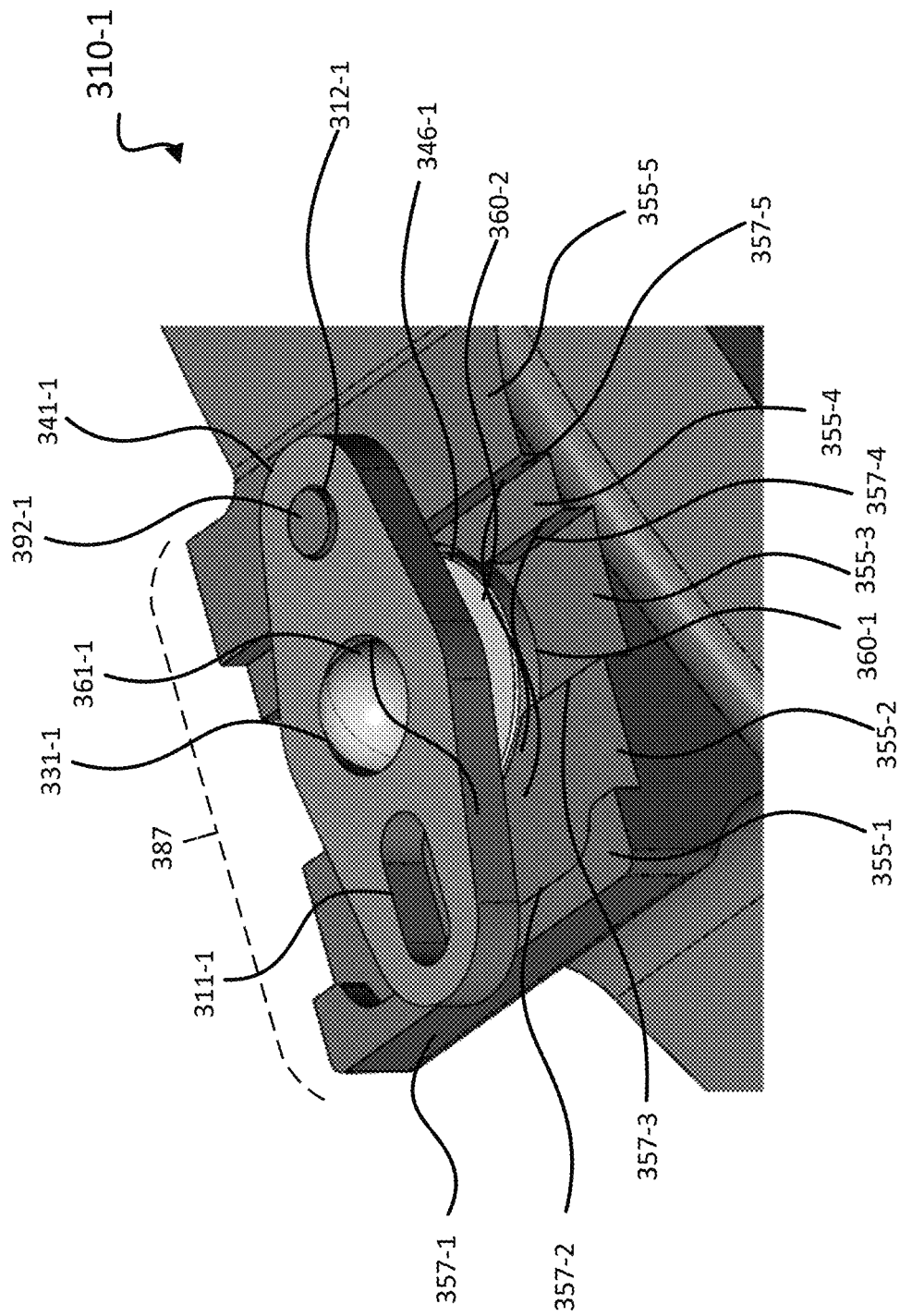
FIG. 3D illustrates a movable guidance configuration of the movable carriage of FIG. 3C in accordance with some embodiments.
Figure 3E:
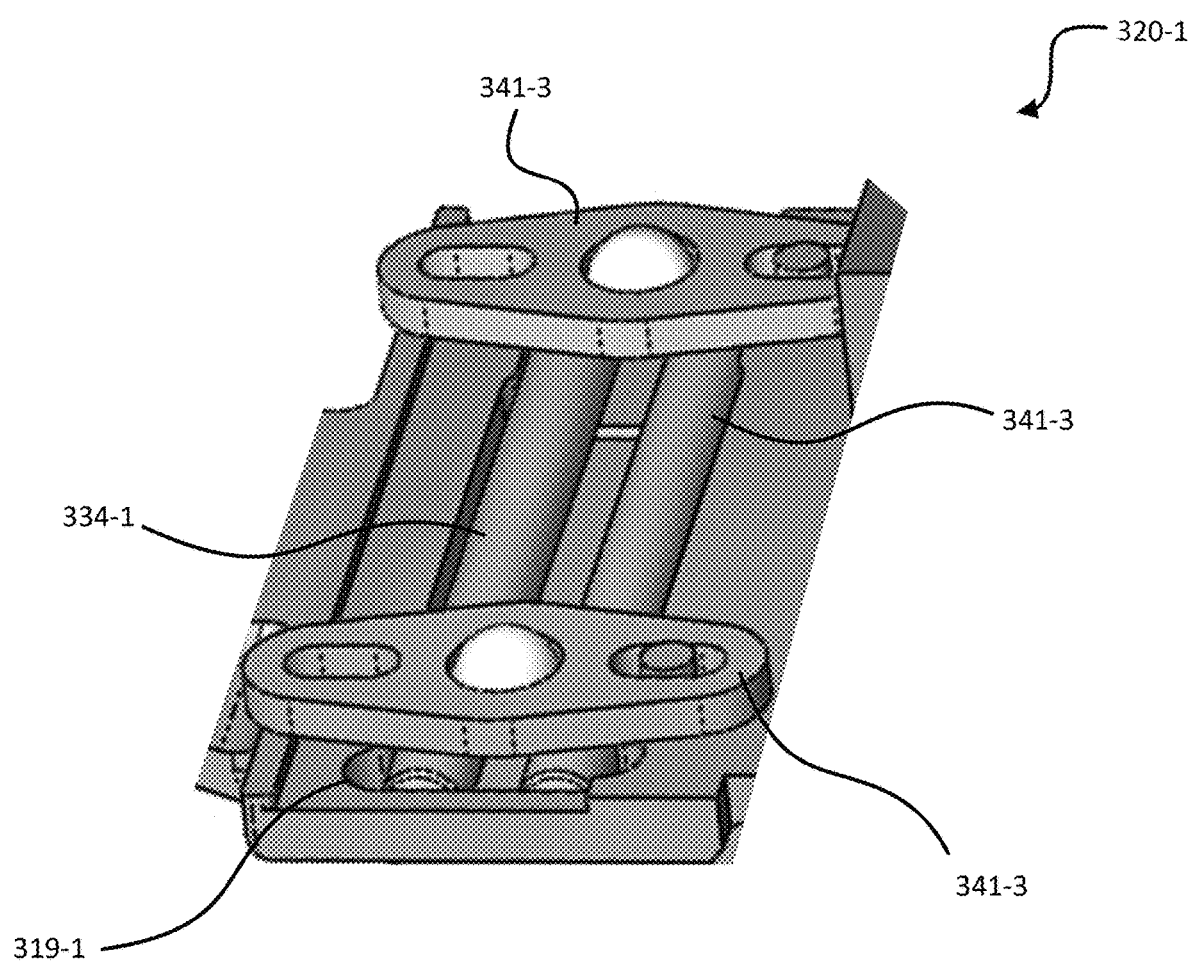
FIG. 3E illustrates a movable guidance configuration of FIG. 3C in accordance with some embodiments.
Figure 3F:
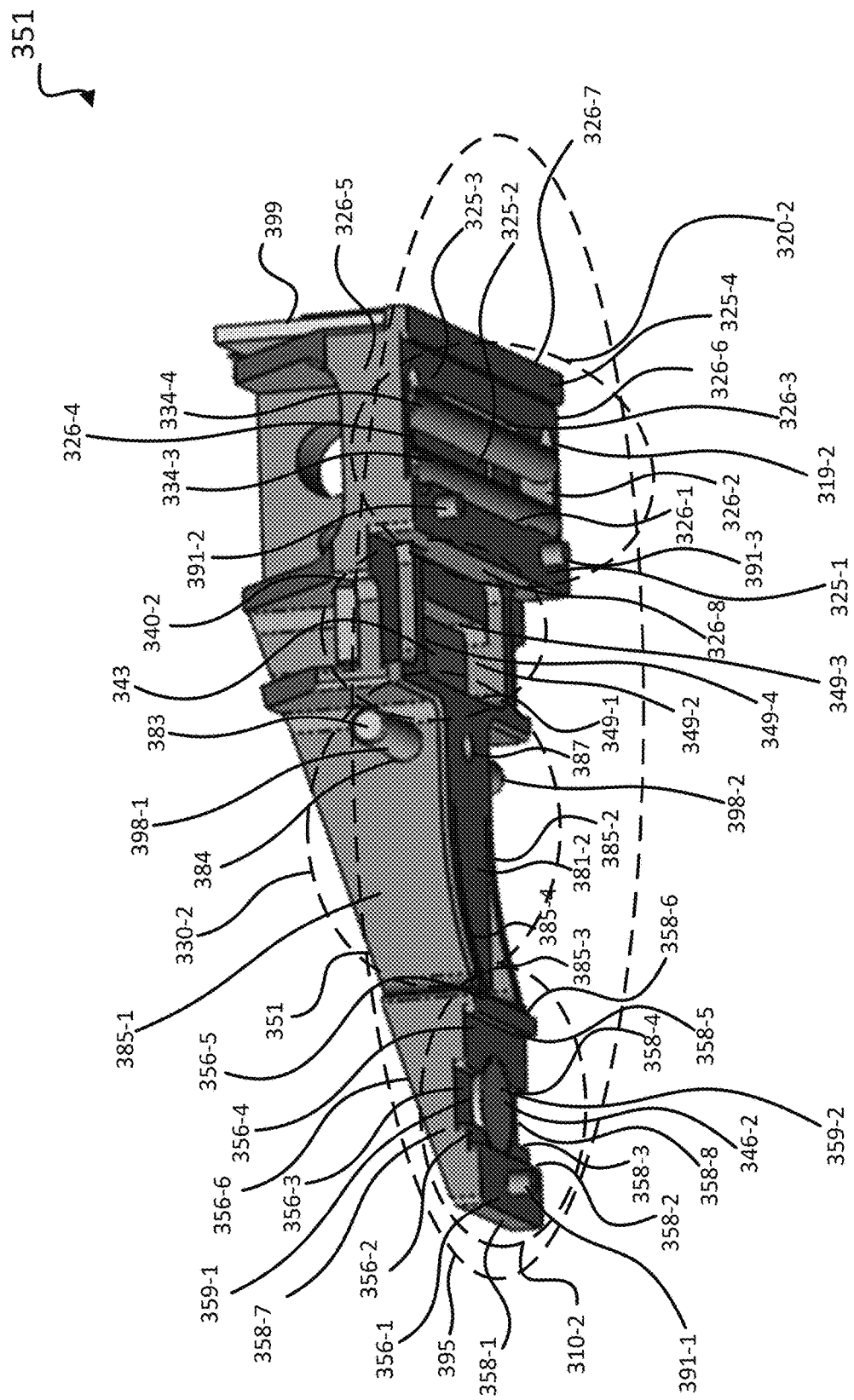
FIG. 3F illustrates a fixed carriage in accordance with some embodiments.
Figure 3G:
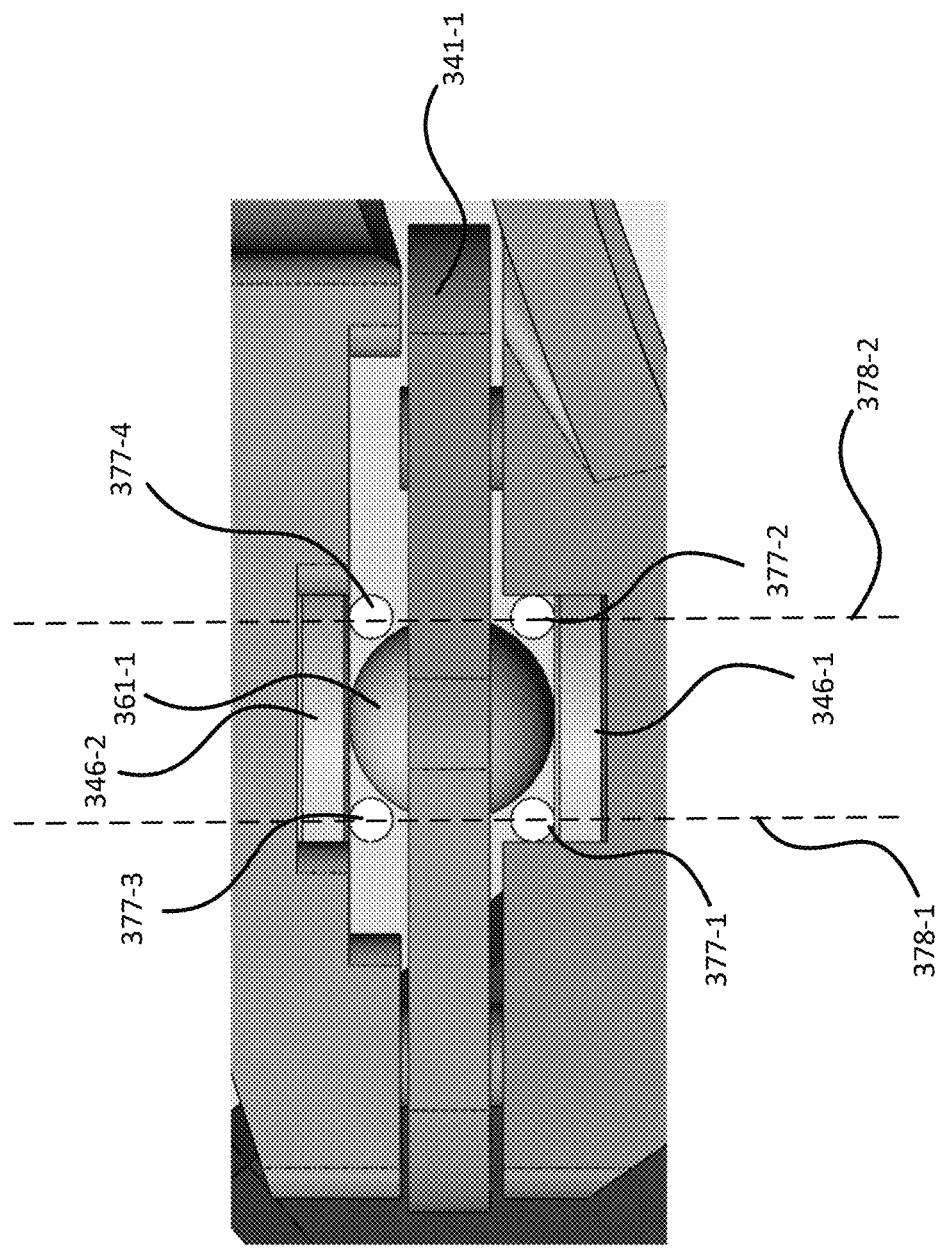
FIG. 3G illustrates an alternate embodiment of a tandem guidance configuration of FIG. 3A in accordance with some embodiments.
Figure 3H:
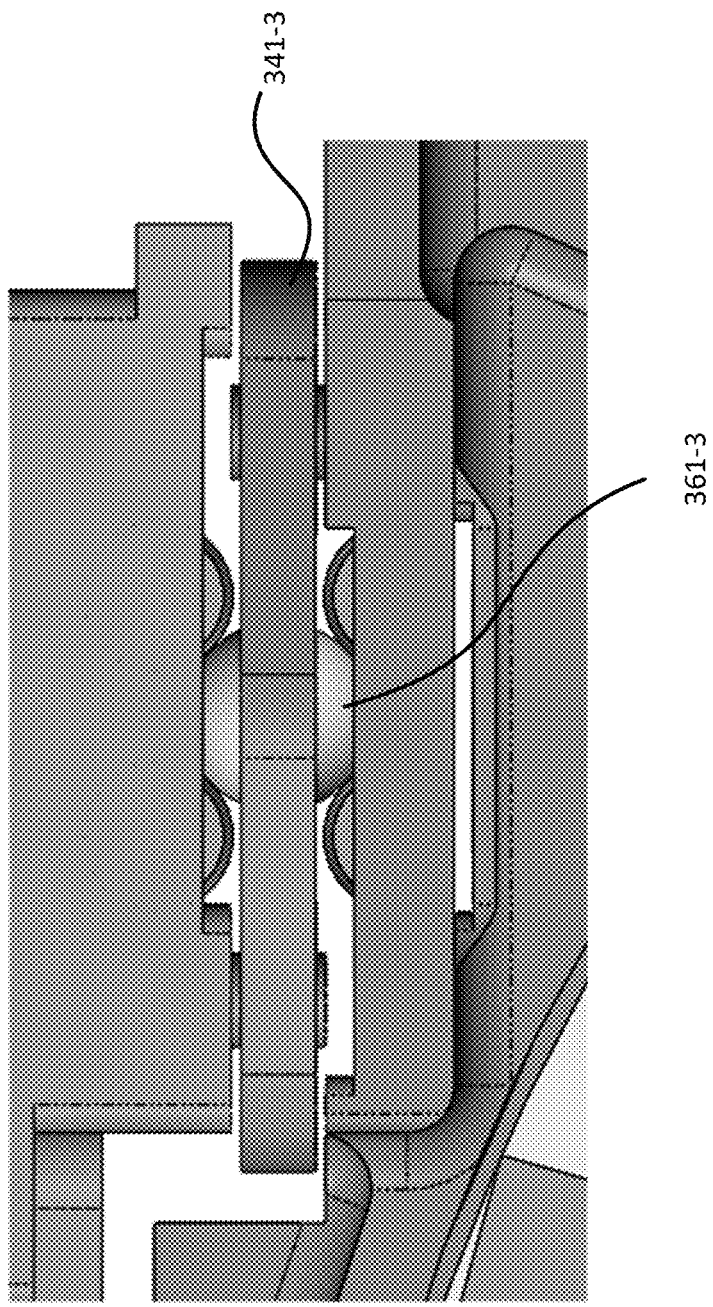
FIG. 3H illustrates an alternate embodiment of a tandem guidance configuration of FIG. 3A in accordance with some embodiments.

FIG. 3B is a diagram illustrating a portion of the guidance system 300 that includes the actuator 302 and the movable carriage 352 in accordance with some embodiments. FIG. 3C is a diagram illustrating a top view of movable carriage guidance configuration 394 of FIG. 3B in more detail in accordance with some embodiments. FIG. 3D is a diagram illustrating a movable guidance configuration 310-1 of FIG. 3C in accordance with some embodiments. FIG. 3E is a diagram illustrating a movable guidance configuration 310-1 in accordance with some embodiments. FIG. 3F is a diagram illustrating a fixed carriage 351 that includes a fixed carriage guidance configuration 395 in further detail in accordance with some embodiments. FIG. 3G is a diagram illustrating an alternate embodiment of a tandem guidance configuration 310 of FIG. 3A in accordance with some embodiments. FIG. 3H is a diagram illustrating an alternate embodiment of a tandem guidance configuration 320 of FIG. 3A in accordance with some embodiments.

In some embodiments, as illustrated in FIG. 3A, the movable carriage 352 includes a movable carriage guidance configuration 394 that works in tandem with a fixed carriage guidance configuration 395 (of fixed carriage 351 illustrated in FIG. 3F) to guide the movement of optics block 104 along the optical axis 308 while minimizing parasitic motion errors related to the motion of, for example, optics block 104 or movable carriage 352 of HMD 101. In some embodiments, the movable carriage guidance configuration 394 includes a movable guidance configuration 310-1, a movable guidance configuration 320-1, a movable retaining configuration 330-1, and a movable preload configuration 340-1. In some embodiments, as illustrated in FIG. 3F, the fixed carriage guidance configuration 395 includes a fixed guidance configuration 310-2, a fixed guidance configuration 320-2, a fixed retaining configuration 330-2, and a fixed preload configuration 340-2. In some embodiments, the fixed guidance configuration 310-2, the fixed guidance configuration 320-2, the fixed retaining configuration 330-2, and the fixed preload configuration 340-2 of the fixed carriage 351 are coupled to the movable guidance configuration 310-1, the movable guidance configuration 320-1, the movable retaining configuration 330-1, and the movable preload configuration 340-1 of the movable carriage 352 respectively to form the guidance system 300 of HMD 101 in FIG. 3A.

Guidance Configuration 370

In some embodiments, the movable carriage guidance configuration 394 of FIG. 3B and the fixed carriage guidance configuration 395 of FIG. 3F combine to form a guidance configuration 370 of FIG. 3A. In some embodiments, the guidance configuration 370 includes a tandem guidance configuration 310, a tandem retaining configuration 330, a tandem preload configuration 340, and a tandem guidance configuration 320. In some embodiments, the tandem guidance configuration 310, the tandem retaining configuration 330, the tandem preload configuration 340, and the tandem guidance configuration 320 are included as part of guidance configuration 370 to adjust the location of optics block 104 while minimizing parasitic motion errors related to the motion of, for example, optics block 104 or movable carriage 352 of HMD 101. Examples of parasitic motion errors include errors in angular orientation (e.g., pitch, yaw, roll) and motion straightness (e.g., de-centering, dx, dy).

In some embodiments, in order to minimize parasitic motion errors, tandem guidance configuration 310, tandem retaining configuration 330, tandem preload configuration 340, and tandem guidance configuration 320 are configured to rectify errors that typically occur in HMD guidance systems. For example, in some embodiments, tandem guidance configuration 310 and tandem guidance configuration 320 utilize anti-creep mechanisms 341 (described further herein) to prevent bearing ball creep associated with the bearing balls 361 of guidance system 300 when moving movable carriage 352 along the optical axis 308. In some embodiments, tandem retaining configuration 330 and tandem preload configuration 340 are configured to minimize motion errors in angular orientation (e.g., pitch, yaw, roll) by, for example, limiting the angular motion of fixed carriage 351 and movable carriage 352 and preventing the decoupling fixed carriage 351 from the movable carriage 352. In some embodiments, the tandem preload configuration 340 is configured to minimize motion errors by utilizing magnetism associated with a preload magnet 372 of the movable carriage 352 and a preload target 343 of the fixed carriage 351 to limit movement of the fixed carriage 351 vertically in a third direction 379 along the y-axis. In some embodiments, the tandem retaining configuration 330 is configured to minimize motion errors by utilizing hooks (e.g., hook 371-1, hook 371-2) of movable carriage 352, and a rod (e.g., rod 383) of fixed carriage 351 to limit movement of the fixed carriage 351 vertically in the third direction 379 and along the optical axis 308 (described further in detail herein). In some embodiments, by rectifying errors specific to the functionality of each configuration, the tandem guidance configuration 310, the tandem retaining configuration 330, the tandem preload configuration 340, and the tandem guidance configuration 320 are able to minimize parasitic motion errors related to the movement of optics block 104 and movable carriage 352 of HMD 101.

Tandem Guidance Configuration 310 and Tandem Guidance Configuration 320

In some embodiments, the tandem guidance configuration 310 and the tandem guidance configuration 320 are positioned in guidance configuration 370 to guide movable carriage 352 in a first direction 368 and a second direction 369 when, for example, actuator 302 moves the movable carriage 352 along the optical axis 308. In some embodiments, as stated previously, the tandem guidance configuration 310 and the tandem guidance configuration 320 utilize anti-creep mechanisms 341 (e.g., anti-creep mechanism 341-1, anti-creep mechanism 341-2, and anti-creep mechanism 341-3 of FIG. 3B and FIG. 3C) to mitigate the amount of bearing ball creep associated with bearing balls 361 (e.g., bearing ball 361-1, bearing ball 361-2, and bearing ball 361-3) that are used in movable carriage 352 to move the optics block 104 to the appropriate viewing position for a user of the HMD 101.

In some embodiments, in order to keep the anti-creep mechanisms 341 of tandem guidance configuration 310 and tandem guidance configuration 320 stable during operation of HMD 101, fixed carriage 351 of FIG. 3A and FIG. 3F is configured to operate as the fixed base for the anti-creep mechanisms 341 of guidance system 300. In some embodiments, fixed carriage 351 is considered a fixed base since the movement of fixed carriage 351 is fixed relative to the motion of the anti-creep system (e.g., the combination of anti-creep mechanism 341-1, anti-creep mechanism 341-2, and anti-creep mechanism 341-3) and movable carriage 352. In some embodiments, the fixed carriage 351 is securely fixed in varifocal actuation block 106 of HMD 101 using screws, pins, or some other type of securement device. In some embodiments, the fixed carriage 351 is positioned in varifocal actuation block 106 to allow encoder 399 to remain fixed to fixed carriage 351 while actuator 302 moves movable carriage 352 in the first direction 368 or the second direction 369 relative to optical axis 308. In some embodiments, the optical axis 308 is positioned in the z-direction of the x, y, z coordinate system as illustrated in, for example, FIG. 3A.

In some embodiments, as illustrated in FIG. 3F, the fixed carriage guidance configuration 395 includes the fixed guidance configuration 310-2, the fixed guidance configuration 320-2, the fixed retaining configuration 330-2, and the fixed preload configuration 340-2. In some embodiments, the fixed carriage guidance configuration 395 includes fixed carriage anchor pins 391 (e.g., fixed carriage anchor pin 391-1, fixed carriage anchor pin 391-2, and fixed carriage anchor pin 391-3) that are configured to serve as anchors for anti-creep mechanisms 341 (e.g., anti-creep mechanism 341-1, anti-creep mechanism 341-2, anti-creep mechanism 341-3) of, for example, tandem guidance configuration 310 and tandem guidance configuration 320. In some embodiments, the fixed carriage anchor pins 391 serve as anchors for the anti-creep mechanisms 341 by allowing the anti-creep mechanisms 341, which are coupled to the fixed carriage anchor pins 391 using fixed carriage slots 311 (e.g., fixed carriage slot 311-1, fixed carriage slot 311-2, fixed carriage slot 311-3 in FIG. 3C), to move angularly (e.g., angular movement 388-1 or angular movement 388-2) along an anchor axis 366-1 in the first direction 368 and the second direction 369 and move angularly along an anchor axis 366-2 in the first direction 368 and the second direction 369.

In some embodiments, fixed carriage anchor pins 391 are coupled to the movable carriage 352 along the anchor axis 366-1 and the anchor axis 366-2, which are in the same direction of the z-axis in FIG. 3A. For example, in some embodiments, fixed carriage anchor pin 391-1 is positioned along the anchor axis 366-1 and fixed carriage anchor pin 391-2 and fixed carriage anchor pin 391-3 are positioned along the anchor axis 366-2. In some embodiments, the fixed carriage anchor pins 391 are configured to protrude through fixed carriage slots 311 of the anti-creep mechanisms 341. In some embodiments, the fixed carriage anchor pins 391 protrude through fixed carriage slots 311 such that the fixed carriage anchor pins 391 are flush or approximately flush to the fixed carriage slots 311 of the anti-creep mechanisms 341. In some embodiments, the fixed carriage slots 311 are slots in anti-creep mechanisms 341 that are used to couple the anti-creep mechanisms 341 to the fixed carriage 351 using the fixed carriage anchor pins 391. In some embodiments, the fixed carriage anchor pins 391 are configured to tether the fixed carriage slots 311 of the anti-creep mechanisms 341 to the fixed carriage 351 to allow the anti-creep mechanisms 341 to move angularly along the anchor axis 366-1 and anchor axis 366-2 from the fixed carriage anchor pins 391.

In some embodiments, as illustrated in FIG. 3A, FIG. 3B, and FIG. 3C, movable carriage 352 is configured to operate as a moving stage that moves in the first direction 368 and second direction 369 and control the movement of the anti-creep mechanisms 341 (e.g., anti-creep mechanism 341-1, anti-creep mechanism 341-2, and anti-creep mechanism 341-3) in anti-creep system 309. In some embodiments, movable carriage 352 is considered movable since the movable carriage 352 moves in the first direction 368 and second direction 369 whilst the fixed carriage 351 remains in a fixed position. In some embodiments, the movable carriage 352 is secured to actuator 302 at a securement location 328 using a securement device 322. In some embodiments, securement device 322 may be, for example, a screw, a pin, or some other type of securement device. In some embodiments, the securement device 322 is configured to secure the movable carriage 352 to actuator 302 while the actuator 302 moves the movable carriage 352 in the first direction 368 and the second direction 369.

In some embodiments, as illustrated in FIG. 3B, the movable carriage guidance configuration 394 includes the movable guidance configuration 310-1, the movable guidance configuration 320-1, the movable retaining configuration 330-1, and the movable preload configuration 340-1. In some embodiments, as illustrated in FIG. 3C, movable carriage 352 includes movement control pins 392 that are configured to be coupled to movement control slots 312 of anti-creep mechanisms 341 and configured to allow movable carriage 352 to angularly move anti-creep mechanisms 341 in the first direction 368 and the second direction 369. In some embodiments, movement control pins 392 are configured to act as cams in the movement control slots 312.

In some embodiments, as illustrated in FIG. 3C, movement control pins 392 are coupled to the anti-creep mechanisms 341 along a movement control axis 365-1 and a movement control axis 365-2. In some embodiments, movement control pin 392-1 is positioned along the movement control axis 365-1 and movement control pin 392-2 and movement control pin 392-3 are positioned along the movement control axis 365-2. In some embodiments, the movement control pins 392 are configured to protrude through movement control slots 312 of the anti-creep mechanisms 341. In some embodiments, the movement control pins 392 are configured to be coupled to the movement control slots 312 of the anti-creep mechanisms 341 in order to move the anti-creep mechanisms 341 angularly along the anchor axis 366-1 and anchor axis 366-2 in the first direction 368 and the second direction 369. In some embodiments, the movable carriage 352 is able to use the movement control pins 392 to angularly move the anti-creep mechanisms 341 to positions dictated by the movable carriage 352, since movable carriage 352 controls the movement of the anti-creep mechanisms 341 along the anchor axis 366-1 and anchor axis 366-2.

In some embodiments, as illustrated in FIG. 3A, the movable carriage 352 is positioned adjacent to the fixed carriage 351 in varifocal actuation block 106 such that actuator 302 is able to control the movement of the movable carriage 352 in the first direction 368 and the second direction 369. In some embodiments, the movable carriage 352 is positioned adjacent to the fixed carriage 351 in varifocal actuation block 106 such that the movement control pins 392 of movable carriage 352 are coupled to movement control slots 312 at the movement control axis 365 and fixed carriage anchor pins 391 are coupled to the fixed carriage slots 311 at the anchor axis 366. For example, in some embodiments, the movable carriage 352 is positioned adjacent the fixed carriage 351 in varifocal actuation block 106 such that the movement control pin 392-1 of movable carriage 352 is coupled to movement control slot 312-1 at the movement control axis 365-1, the movement control pin 392-2 of movable carriage 352 is coupled to movement control slot 312-2 at the movement control axis 365-2, and the movement control pin 392-3 of movable carriage 352 is coupled to movement control slot 312-3 at the movement control axis 365-2. Similarly, in some embodiments, the movable carriage 352 is positioned adjacent the fixed carriage 351 in varifocal actuation block 106 such that the fixed carriage anchor pin 391-1 of fixed carriage 351 is coupled to fixed carriage slot 311-1 at the anchor axis 366-1, the fixed carriage anchor pin 391-2 of fixed carriage 351 is coupled to fixed carriage slot 311-2 at the anchor axis 366-2, and the fixed carriage anchor pin 391-3 of fixed carriage 351 is coupled to fixed carriage slot 311-3 at the anchor axis 366-2.

In some embodiments, the distance the movable carriage 352 is configured to move in the first direction 368 and the second direction 369 may be limited by an actuation distance limitation of the actuator 302. In some embodiments, the actuation distance limitation is the maximum distance actuator 302 is configured to move in the first direction 368 and the second direction 369. In some embodiments, the actuation distance limitation may be, for example, 10 millimeters. In some embodiments, other actuation distance limitations may be implemented depending on, for example, the size of the actuator 302 and the HMD 101.

In some embodiments, actuator 302 is configured to control the movement of the movable carriage 352 in either the first direction 368 or the second direction 369 a movement carriage distance. In some embodiments, the movement carriage distance is the distance the movable carriage 352 moves from a first movable carriage position to a second movable carriage position in the first direction 368 or the second direction 369. In some embodiments, the movement carriage distance is limited by the hooks (e.g., hook 371-1 and hook 371-2) of tandem retaining configuration 330. In some embodiments, hook 371-1 and hook 371-2 are configured to provide a hard-stop to the movable carriage 352 when traveling in either the first direction 368 or the second direction 369. In some embodiments, the movement carriage distance is limited by the hook 371-1 in the second direction 369 and hook 371-2 in the first direction 368. In some embodiments, the movement carriage distance is dictated by the focus prediction module 108 and may range from, for example, 0.01 millimeters to 10 millimeters. For example, focus prediction module 108 may dictate that actuator 105 move movable carriage 352 a movement carriage distance of 3 millimeters in the first direction 368 from the first movable carriage position to the second movable carriage position. In some embodiments, other distances of the movement carriage distance may be provided by focus prediction module 108 depending on, for example, the size of the movable carriage 352 and the HMD 101. In some embodiments, when movable carriage 352 is traveling the movement carriage distance in the first direction 368 or the second direction 369, the movable carriage 352 is guided by tandem guidance configuration 310 and tandem guidance configuration 320.

In some embodiments, the tandem guidance configuration 310 of FIG. 3A includes movable guidance configuration 310-1 of FIG. 3B and fixed guidance configuration 310-2 of FIG. 3F. In some embodiments, as illustrated in FIG. 3F, the fixed guidance configuration 310-2 includes a fixed carriage anchor pin 391-1, a disc 346-2, a platform surface 356-1, a platform surface 356-2, a platform surface 356-3, a platform surface 356-4, a platform surface 356-5, a platform surface 356-6, a side surface 358-1, a side surface 358-2, a side surface 358-3, a side surface 358-4, a side surface 358-5, a side surface 358-6, a side surface 358-7, and a side surface 358-8. In some embodiments, as illustrated in FIG. 3D, the movable guidance configuration 310-1 includes a platform surface 355-1, a platform surface 355-2, a platform surface 355-3, a platform surface 355-4, a platform surface 355-5, a side surface 357-1, a side surface 357-2, a side surface 357-3, a side surface 357-4, a side surface 357-5, a movement control pin 392-1, the bearing ball 361-1, the disc 346-1, and the anti-creep mechanism 341-1.

In some embodiments, as illustrated in the fixed guidance configuration 310-2 of FIG. 3F, platform surface 356-2 and platform surface 356-4 are configured such that disc 346-2 is positioned with a first side 359-1 of disc 346-2 flush, or approximately flush, against platform surface 356-3 and a second side 359-2 flush, or approximately flush with platform surface 356-2 and platform surface 356-4. In some embodiments, platform surface 356-2 and platform surface 356-4 are configured such that side surface 358-3 and side surface 358-4 conform to the shape of disc 346-2. In some embodiments, side surface 358-3 and side surface 358-4 conform to the shape of disc 346-2 such that disc 346-2 may be positioned between side surface 358-3 and side surface 358-4. In some embodiments, disc 346-2 may be, for example, in the shape of a circle or other shape. In some embodiments, for example, side surface 358-3 and side surface 358-4 circularly conform to the circular shape of disc 346-2 to allow disc 346-2 to be positioned such that the first side 359-1 of disc 346-2 is flush, or approximately flush, against platform surface 356-3 and the second side 359-2 is flush, or approximately flush with platform surface 356-2 and platform surface 356-4. In some embodiments, disc 346-2 may be positioned such that disc 346-2 is centrally located between platform surface 356-2 and platform surface 356-4.

In some embodiments, as illustrated in the movable guidance configuration 310-1 of FIG. 3D, platform surface 355-2 and platform surface 355-4 are positioned such that disc 346-1 is positioned with a first side 360-1 of disc 346-1 flush, or approximately flush, against platform surface 355-3 and a second side 360-2 flush, or approximately flush with platform surface 355-2 and platform surface 355-4. In some embodiments, platform surface 355-2 and platform surface 355-4 are configured such that side surface 357-3 and side surface 357-4 conform to the shape of disc 346-1. In some embodiments, side surface 357-3 and side surface 357-4 conform to the shape of disc 346-1 such that disc 346-1 may be positioned between side surface 357-3 and side surface 357-4. In some embodiments, for example, side surface 357-3 and side surface 357-4 circularly conform to the circular shape of disc 346-1 to allow disc 346-1 to be positioned such that the first side 360-1 of disc 346-1 is flush, or approximately flush, against platform surface 355-3 and the second side 360-2 is flush, or approximately flush with platform surface 355-2 and platform surface 355-4. In some embodiments, disc 346-1 may be positioned such that disc 346-1 is centrally located between platform surface 355-2 and platform surface 355-4. In some embodiments, disc 346-1 may be, for example, in the shape of a circle or other shape that allows disc 346-1 to be positioned between side surface 357-3 and side surface 357-4.

An example embodiment of the positioning of disc 346-1 and disc 346-2 in HMD 101 is illustrated in the tandem guidance configuration 310 of FIG. 3A. In some embodiments, the disc 346-2 of fixed guidance configuration 310-2 is positioned parallel to disc 346-1 of the movable guidance configuration 310-1. In some embodiments, the disc 346-2 of fixed guidance configuration 310-2 is positioned parallel to disc 346-1 of the movable guidance configuration 310-1 to allow movement of bearing ball 361-1 in the first direction 368 and the second direction 369 during movement of movable carriage 352. In some embodiments, the disc 346-2 of fixed guidance configuration 310-2 is positioned parallel to disc 346-1 of the movable guidance configuration 310-1 such that the center of disc 346-2 is aligned with the center of disc 346-1 of movable carriage 352 to allow movement of bearing ball 361-1 in the first direction 368 and the second direction 369.

In some embodiments, in order to form the tandem guidance configuration 310 depicted in FIG. 3A, the fixed guidance configuration 310-2 is coupled to movable guidance configuration 310-1 using fixed carriage anchor pin 391-1. In some embodiments, fixed carriage anchor pin 391-1 is coupled to the movable guidance configuration 310-1 such that the fixed carriage anchor pin 391-1 is affixed to the movement control slot 312-1, allowing the movable carriage 352 to move in the first direction 368 and the second direction 369 while limiting the amount of bearing ball creep associated with bearing ball 361-1 and minimizing motion straightness and lens location errors related to optics block 104.

In some embodiments, in addition to using the tandem guidance configuration 310 to guide the optics block 104, HMD 101 also uses tandem guidance configuration 320 of FIG. 3A is to guide optics block 104 and movable carriage 352 in the first direction 368 and the second direction 369. In some embodiments, the tandem guidance configuration 320 includes the movable guidance configuration 320-1 of FIG. 3B and the fixed guidance configuration 320-2 of FIG. 3F. In some embodiments, as illustrated in FIG. 3F, the fixed guidance configuration 320-2 includes a platform 325-1, a platform 325-2, a platform 325-3, a platform 325-4, a side surface 326-1, a side surface 326-2, a side surface 326-3, a side surface 326-4, a side surface 326-5, a side surface 326-6, a side surface 326-7, a side surface 326-8, a fixed carriage anchor pin 391-2, a fixed carriage anchor pin 391-2, a bearing ball cradle pin compartment 319-2, a bearing ball cradle pin 334-3, and a bearing ball cradle pin 334-4. In some embodiments, as illustrated in FIG. 3B and FIG. 3C, the movable guidance configuration 320-1 includes a bearing ball cradle pin 334-1, a bearing ball cradle pin 334-2, an anti-creep mechanism 341-2, an anti-creep mechanism 341-3, a bearing ball 361-2, a bearing ball 361-3, and a bearing ball cradle pin compartment 319-1.

In some embodiments, bearing ball cradle pin 334-1, bearing ball cradle pin 334-2, bearing ball cradle pin 334-3, and bearing ball cradle pin 334-4 may be, for example, a dowel rod or dowel pin. In some embodiments, bearing ball cradle pin 334-1, bearing ball cradle pin 334-2, bearing ball cradle pin 334-3, and bearing ball cradle pin 334-4 may be made of, for example, plastic or metal. In some embodiments, the length and diameter of bearing ball cradle pin 334-1 and bearing ball cradle pin 334-2 are equivalent to the length and diameter of bearing ball cradle pin 334-3 and bearing ball cradle pin 334-4. In some embodiments, the length and diameter of bearing ball cradle pin 334-1, bearing ball cradle pin 334-2, bearing ball cradle pin 334-3, and bearing ball cradle pin 334-4 may vary depending on, for example, the size of fixed guidance configuration 320-2, bearing ball cradle pin compartment 319-1, bearing ball cradle pin compartment 319-2, or the movable guidance configuration 320-1 of HMD 101.

In some embodiments, as illustrated in movable carriage guidance configuration 394 of FIG. 3B and FIG. 3C, the bearing ball cradle pin compartment 319-1 is configured to allow bearing ball cradle pin 334-1 and bearing ball cradle pin 334-2 to be positioned in the bearing ball cradle pin compartment 319-1. In some embodiments, the bearing ball cradle pin 334-1 and the bearing ball cradle pin 334-2 are positioned in bearing ball cradle pin compartment 319-1 as a parallel structure that allows bearing ball 361-2 and bearing ball 361-3 to ride and utilize bearing ball cradle pin 334-1 and bearing ball cradle pin 334-2 as a guide during movement of movable carriage 352 in the first direction 368 and the second direction 369. In some embodiments, the bearing ball cradle pin compartment 319-1 is configured to allow bearing ball cradle pin 334-1 and bearing ball cradle pin 334-2 to cradle bearing ball 361-2 and bearing ball 361-3 in between bearing ball cradle pin 334-1 and bearing ball cradle pin 334. In some embodiments, the distance between the bearing ball cradle pin 334-1 and the bearing ball cradle pin 334-2 in the parallel structure is such that the distance allows bearing ball 361-2 to ride and utilize bearing ball cradle pin 334-1 and bearing ball cradle pin 334-2 as a guide during movement of movable carriage 352 in the first direction 368 and the second direction 369. In some embodiments, the distance between bearing ball cradle pin 334-3 and bearing ball cradle pin 334-4 is equal to the distance between bearing ball cradle pin 334-1 and bearing ball cradle pin 334-2. In some embodiments, bearing ball cradle pin 334-1 is positioned parallel to bearing ball cradle pin 334-2 in bearing ball cradle pin compartment 319-1.

In some embodiments, as illustrated in fixed carriage guidance configuration 395 of FIG. 3F, the bearing ball cradle pin compartment 319-2 is configured to allow bearing ball cradle pin 334-3 and bearing ball cradle pin 334-4 to be positioned in bearing ball cradle pin compartment 319-2. In some embodiments, the bearing ball cradle pin 334-3 and the bearing ball cradle pin 334-4 are positioned in bearing ball cradle pin compartment 319-2 as a parallel structure that allows bearing ball 361-2 and bearing ball 361-3 to utilize the parallel structure as a guide while bearing ball 361-2 and bearing ball 361-3 ride bearing ball cradle pin 334-1 and bearing ball cradle pin 334-2 during, for example, movement of movable carriage 352 in the first direction 368 or second direction 369.

As stated previously, the tandem guidance configuration 310 and the tandem guidance configuration 320 utilize anti-creep mechanism 341-1, anti-creep mechanism 341-2, and anti-creep mechanism 341-3 to move the optics block 104 to the appropriate viewing position in HMD 101 and to mitigate the amount of bearing ball creep associated bearing ball 361-1, bearing ball 361-2, and bearing ball 361-3 in movable carriage 352. In some embodiments, anti-creep mechanism 341-1 is positioned in tandem guidance configuration 310 such that the anti-creep mechanism 341-1 is centrally located in the tandem guidance configuration 310. In some embodiments, anti-creep mechanism 341-2 is positioned at a first end of parallel bearing ball cradle pin 334-1 and bearing ball cradle pin 334-2 and anti-creep mechanism 341-3 is positioned at a second end of bearing ball cradle pin 334-1 and bearing ball cradle pin 334-2.

In some embodiments, anti-creep mechanism 341-1, anti-creep mechanism 341-2, and anti-creep mechanism 341-3 are triangularly positioned on movable carriage 352 such that the distance from the center of anti-creep mechanism 341-1 to the center of anti-creep mechanism 341-2 is equivalent to the distance from the center of anti-creep mechanism 341-1 to the center of anti-creep mechanism 341-3. In some embodiments, the triangular positioning of anti-creep mechanism 341-1, anti-creep mechanism 341-2, and anti-creep mechanism 341-2 is in the shape of an isosceles triangle with the perpendicular bisector of the base of the isosceles triangle bisecting the center of the preload magnet 372 to the apex of the isosceles triangle, which is located at the center of anti-creep mechanism 341-1. In some embodiments, positioning of anti-creep mechanism 341-1 central to the tandem guidance configuration 310, positioning of anti-creep mechanism 341-2 at the first end of parallel bearing ball cradle pin 334-1 and bearing ball cradle pin 334-2, and positioning of anti-creep mechanism 341-3 at the second end of bearing ball cradle pin 334-1 and bearing ball cradle pin 334-2 allows actuator 302 to angular move anti-creep mechanism 341-1, anti-creep mechanism 341-2, and anti-creep mechanism 341-3 in the first direction 368 and second direction 369.

In some embodiments, as illustrated in the tandem guidance configuration 310, the anti-creep mechanism 341-1 includes fixed carriage slot 311-1, movement control slot 312-1 and bearing ball slot 331-1. In some embodiments, the bearing ball slot 331-1 of anti-creep mechanism 341-1 is configured to surround the bearing ball 361-1 to limit the motion of the bearing ball 361-1 when the movable carriage 352 moves in the first direction 368 and the second direction 369. In some embodiments, in addition to the bearing ball 361-1 being positioned in bearing ball slot 331-1, the bearing ball 361-1 is positioned between the disc 346-1 and the disc 346-2 to allow movement of the anti-creep mechanism 341-1 the first direction 368 and the second direction 369. In some embodiments, as stated previously, the anti-creep mechanism 341-1, in addition to allowing movement of the movable carriage 352 along the optical axis 308, is configured to mitigate the amount of ball bearing creep associated with bearing ball 361-1 during operation of HMD 101.

In some embodiments, as illustrated in FIG. 3B and FIG. 3C, each anti-creep mechanism 341 (e.g., anti-creep mechanism 341-1, anti-creep mechanism 341-2, and anti-creep mechanism 341-3) has an associated bearing ball slot 331 (e.g., bearing ball slot 331-1, bearing ball slot 331-2, and bearing ball slot 331-3 depicted in FIG. 3C) that is configured to surround bearing balls 361 (e.g., bearing ball 361-1, bearing ball 361-2, and bearing ball 361-3 depicted in FIG. 3B) to limit the motion of the bearing balls 361 when the movable carriage 352 moves in the first direction 368 and the second direction 369.

In some embodiments, the positioning of the bearing balls 361 within the bearing ball slots 331, in combination with an angular positioning of the anti-creep mechanisms 341 during the movement of the movable carriage 352 in the first direction 368 or second direction 369, prevent the bearing balls 361 from having an associated bearing ball creep. In some embodiments, the anti-creep mechanisms 341 prevent bearing ball creep by limiting the movement of the bearing balls 361 to within the bearing ball slots 331 when the movable carriage 352 is moving in, for example, the first direction 368 and the second direction 369.

The ability of tandem guidance configuration 310 and tandem guidance configuration 320 to limit bearing ball creep in the guidance system 300 during the movement of movable carriage 352 allows the guidance system 300 to mitigate parasitic motion errors during operation of HMD 101.

The Tandem Retaining Configuration 330

As state previously, in some embodiments, the tandem retaining configuration 330 is configured to minimize motion errors in guidance system 300 by utilizing hooks (e.g., hook 371-1, hook 371-2) of movable carriage 352, and rod (e.g., rod 383) of fixed carriage 351. In some embodiments, utilization of hook 371-1, hook 371-2, and rod 383 by tandem retaining configuration 330 allows the tandem retaining configuration 330 to limit movement of the fixed carriage 351 vertically in the third direction 379 and limit the movement of the movable carriage 352 horizontally in the z-direction using the hooks as physical barriers or backstops in the first direction 368 and the second direction 369 along the optical axis 308.

In some embodiments, as illustrated in FIG. 3A, the tandem retaining configuration 330 is coupled to tandem guidance configuration 310 and tandem preload configuration 340. In some embodiments, the tandem retaining configuration 330 includes the fixed retaining configuration 330-2 of FIG. 3F and the movable retaining configuration 330-1 of FIG. 3B. In some embodiments, the fixed retaining configuration 330-2 and the movable retaining configuration 330-1 are configured to work in tandem to prevent a physical separation or decoupling between fixed carriage 351 and movable carriage 352 and to provide a limit to the amount of movement of movable carriage 352 in the first direction 368 and the second direction 369 direction of optical axis 308.

In some embodiments, as illustrated in FIG. 3B, the movable retaining configuration 330-1 includes a platform 381-1, the hook 371-1, and the hook 371-2. In some embodiments, hook 371-1 and hook 371-2 are similar in shape and configured to be in the shape of a hook. In some embodiments, hook 371-1 is congruent to hook 371 and curved such that each may hook onto a rod 383 of fixed retaining configuration 330-2. In some embodiments, a distance between the hook 371-1 and the hook 371-2 of movable retaining configuration 330-1 is at least a width greater than the width of the fixed carriage 351 of FIG. 3F. In some embodiments, the distance between the hook 371-1 and the hook 371-2 of movable retaining configuration 330-1 is such that the hook 371-1 and hook 371-2 are able to be affixed to a hook side 398-1 and a hook side 398-2 of rod 383 of FIG. 3F. In some embodiments, the distance between hook side 398-1 and hook side 398-2 may be, for example, at least a width of the fixed carriage 351, the hook 371-1 and hook 371-2 combined.

In some embodiments, as illustrated in FIG. 3F, the fixed retaining configuration 330-2 includes the rod 383, a pull-through slot 384, a side 385-1, a side 385-2, a side 385-3, a side 385-4, a platform 381-2, and an opening 387. In some embodiments, the rod 383 is held in place in fixed carriage 351 using the pull-through slot 384. In some embodiments, the rod 383 may be made of, for example, plastic, metal, or some other material capable of being utilized as part of the fixed retaining configuration 330-2 of HMD 101. In some embodiments, the rod 383 is configured to be in the shape of a cylinder or other shape that allows rod 383 to be pulled through the pull-through slot 384. In some embodiments, the rod 383 is configured to be a length and diameter that allows rod 383 to protrude through pull-through slot 384 on side 385-2 and side 385-1 of fixed carriage 351 such that rod 383 may be affixed or coupled to the hook 371-1 and the hook 371-2 of movable retaining configuration 330-1 (as illustrated in FIG. 3A and FIG. 3B). In some embodiments, rod 383 may be affixed or coupled to the hook 371-1 and the hook 371-2 at the hook side 398-1 and the hook side 398-2 of rod 383, respectively.

In some embodiments, pull-through slot 384 is configured to be in, for example, a hollow shape that allows rod 383 to be pulled-through and situated in pull-through slot 384. In some embodiments, for example, pull-through slot 384 may be in the shape of a hollow cylinder that allows rod 383 to be pulled through pull-through slot 384 and affixed to the hook 371-1 and the hook 371-2. In some embodiments, the shape of the pull-through slot 384 is such that it allows rod 383 to be securely fastened or coupled to the hook 371-1 and the hook 371-2. In some embodiments, the pull-through slot 384 extends from a side 385-1 to a side 385-2 of fixed carriage 351.

In some embodiments, as further illustrated in FIG. 3F, the side 385-1, the side 385-1, and the platform 381-2 (which includes the opening 387 located parallel to the pull-through slot 384) extend from fixed guidance configuration 310-2 to the fixed preload configuration 340-2. In some embodiments, opening 387 may be, for example, a circular slot or other type of geometric shape. In some embodiments, side 385-3 and side 385-4 are configured to allow a curved shape of platform 381-1 of fixed retaining configuration 330-2 that is shaped similar to the curvature of platform 381-1 of movable carriage guidance configuration 394.

In some embodiments, as illustrated in FIG. 3A, the hook 371-1 and the hook 371-2 of movable retaining configuration 330-1 are configured to hook onto or lock onto the rod 383 of fixed retaining configuration 330-2 and prevent fixed carriage 351 from decoupling from movable carriage 352. In some embodiments, the hook 371-1 and the hook 371-2 are configured to lock onto the rod 383 and prevent fixed carriage 351 from decoupling from movable carriage 352 when, for example, tandem preload configuration 340 does not prevent fixed carriage 351 from decoupling from movable carriage 352 using a magnetic preload. For example, in some embodiments, when the magnetic preload provided by tandem preload configuration 340 (described further herein) does not prevent the fixed carriage 351 and movable carriage 352 from decoupling in the y-direction as exemplified in FIG. 3A, the tandem retaining configuration 330 prevents fixed carriage 351 from decoupling from movable carriage 352. In some embodiments, tandem retaining configuration 330 may be considered a "back-up" retaining configuration (to tandem preload configuration 340) to prevent movement in the y-direction when the magnetic preload provided by the combination of the preload magnet 372 of fixed preload configuration 340-2 and the preload target of movable preload configuration 340-1 is overcome due to, for example, physical forces that occur while using HMD 101 (e.g., a dropping of HMD 101 on the floor by the user of the HMD 101).

In some embodiments, in addition to preventing the fixed carriage 351 from decoupling from movable carriage 352 in the y-direction, the fixed retaining configuration 330-2 is configured work with the movable retaining configuration 330-1 to limit the motion of the movable carriage 352 in the direction of the optical axis 308 (e.g., first direction 368 and the second direction 369). In some embodiments, for example, side 385-1 and side 385-2 combine with the rod 383, the hook 371-1, and the hook 371-2 to limit the motion of the movable carriage 352 in the direction of the optical axis 308 by providing a barrier to movement when the hook 371-1 encounters the side 385-1 during movement of movable carriage 352 in the first direction 368 and when the hook 371-2 encounters the side 385-2 during movement of movable carriage 352 in the second direction 369. In some embodiments, the rod 383, the hook 371-1, and the hook 371-2, combine to retain the movable carriage 352 a fixed distance in the first direction 368 and the second direction 369 within HMD 101. In some embodiments, the fixed retaining configuration 330-2 and the movable retaining configuration 330-1 are configured to work in tandem to prevent movable carriage 352 from surpassing the fixed distance in the first direction 368 and the second direction 369. In some embodiments, the movable carriage 352 cannot move further than the barrier provided by the side 385-1 in the first direction 368 and the movable carriage 352 cannot move further than the barrier provided by the side 385-2 in the second direction 369.

Tandem Preload Configuration 340

As stated previously with reference to FIG. 3A and FIG. 3B, the tandem preload configuration 340 is configured to utilize magnetism between preload magnet 372 and preload target 343 to prevent the decoupling of fixed carriage 351 from movable carriage 352. In some embodiments, the tandem preload configuration 340 includes the fixed preload configuration 340-2 of FIG. 3F and the movable preload configuration 340-1 of FIG. 3B. In some embodiments, the fixed preload configuration 340-2 includes a preload target 343 and a preload target compartment 345. In some embodiments, the preload target compartment 345 is a multi-sided platform configured to secure preload target 343 within a side 349-1, a side 349-2, a side 349-3, and a side 349-4. In some embodiments, the preload target 343 is a magnetic material (such as, for example, steel) that is configured to magnetize the preload magnet 372. In some embodiments, the width, length, and depth of the preload target compartment 345 is such that preload target 343 is able to be securely fastened or positioned in fixed carriage 351 to, for example, prevent movement of the preload target 343 within the preload target compartment 345.

In some embodiments, the movable preload configuration 340-1 includes a preload magnet platform 382 and a preload magnet 372. In some embodiments, the preload magnet platform 382 is a multi-sided platform configured to secure preload magnet 372 onto movable carriage 352. In some embodiments, the width, length, and depth of the preload magnet platform 382 is such that preload magnet 372 is able to be securely fastened or positioned in movable carriage 352 to, for example, prevent movement of the preload magnet 372 within the preload magnet platform 382.

In some embodiments, as stated previously, the tandem preload configuration 340 is configured to utilize magnetism between the fixed preload configuration 340-2 (depicted in FIG. 3F) and the movable preload configuration 340-1 (depicted in FIG. 3B) to prevent separation of movable carriage 352 from fixed carriage 351. In some embodiments, using the magnetism between the preload magnet 372 and the preload target 343, the tandem preload configuration 340 limits the movement of the movable carriage 352 in, for example, the y-direction indicated in FIG. 3A. For example, in some embodiments, when HMD 101 is dropped on the floor or otherwise moved vigorously by the user of HMD 101, the tandem preload configuration 340 prevents the displacement of the fixed carriage 351 from the movable carriage 352 using the magnetism between the preload magnet 372 and the preload target 343. In some embodiments, the magnetism associated with the preload target 343 of fixed preload configuration 340-2 and the preload magnet 372 of movable preload configuration 340-1 prevents movable carriage 352 from decoupling from fixed carriage 351 while still allowing movement between movable carriage 452 and fixed carriage 351 in, for example, the y-direction (depicted in FIG. 3A).

As illustrated in FIG. 3A-FIG. 3F, the combination of tandem guidance configuration 310, tandem guidance configuration 320, tandem retaining configuration 330, and tandem preload configuration 340 allow movement of the optics block 104 and movable carriage 352 along the optical axis 308 while minimizing parasitic motion errors related to the motion of the optics block 104 and movable carriage 352.

With reference to FIG. 3G and FIG. 3H, FIG. 3G illustrates an alternate embodiment of a tandem guidance configuration 310 of FIG. 3A in accordance with some embodiments. FIG. 3H illustrates an alternate embodiment of a tandem guidance configuration 320 of FIG. 3A in accordance with some embodiments. In the tandem guidance configuration 310 of FIG. 3G, additional guidance mechanisms 377 are used to guide bearing ball 361-1 and are placed in between anti-creep mechanism 341-1 and disc 346-1 and in between anti-creep mechanism 341-1 and disc 346-2. In some embodiments, for example, guidance mechanism 377-1 is placed on disc 346-1 on a first side 378-1 of bearing ball 361-1 and guidance mechanism 377-2 is placed on disc 346-1 on a second side 378-2 of bearing ball 361-1. In some embodiments, guidance mechanism 377-3 is placed below disc 346-2 on a first side 378-1 of bearing ball 361-1 and guidance mechanism 377-4 is placed below disc 346-2 on a second side 378-2 of bearing ball 361-1. In the tandem guidance configuration of FIG. 3H, bearing ball cradle pin 334-1 and the bearing ball cradle pin 334-2 are not included the movable carriage 352. That is, in some embodiments, only bearing ball cradle pin 334-3 and bearing ball cradle pin 334-4 are used in tandem guidance configuration 320 to guide the bearing ball 361-3 along the optical axis 308.

Figure 4A:
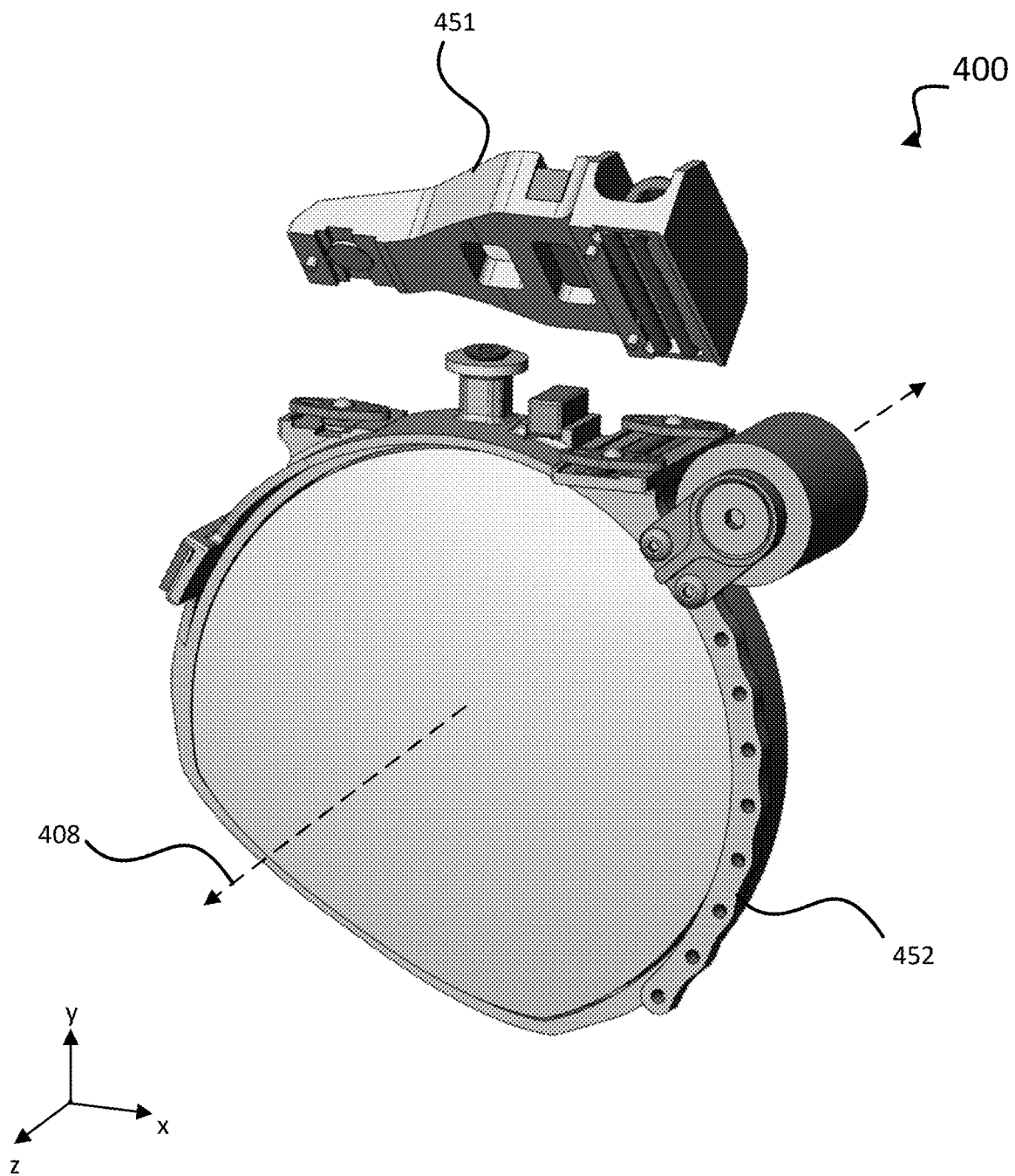
FIG. 4A illustrates a guidance system utilized in the head-mounted display of FIG. 1 in accordance with some embodiments.
Figure 4B:
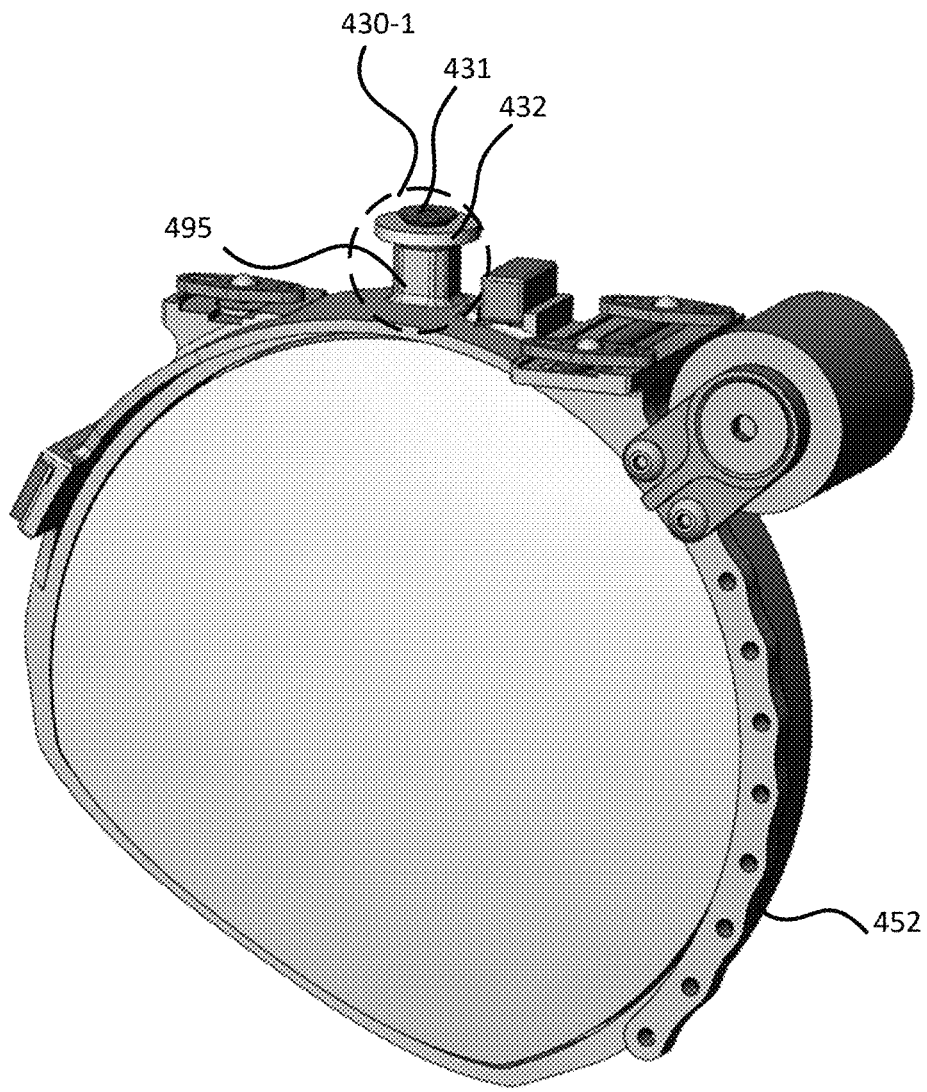
FIG. 4B illustrates a movable carriage 452 of the guidance system of FIG. 4A in accordance with some embodiments.
Figure 4C:
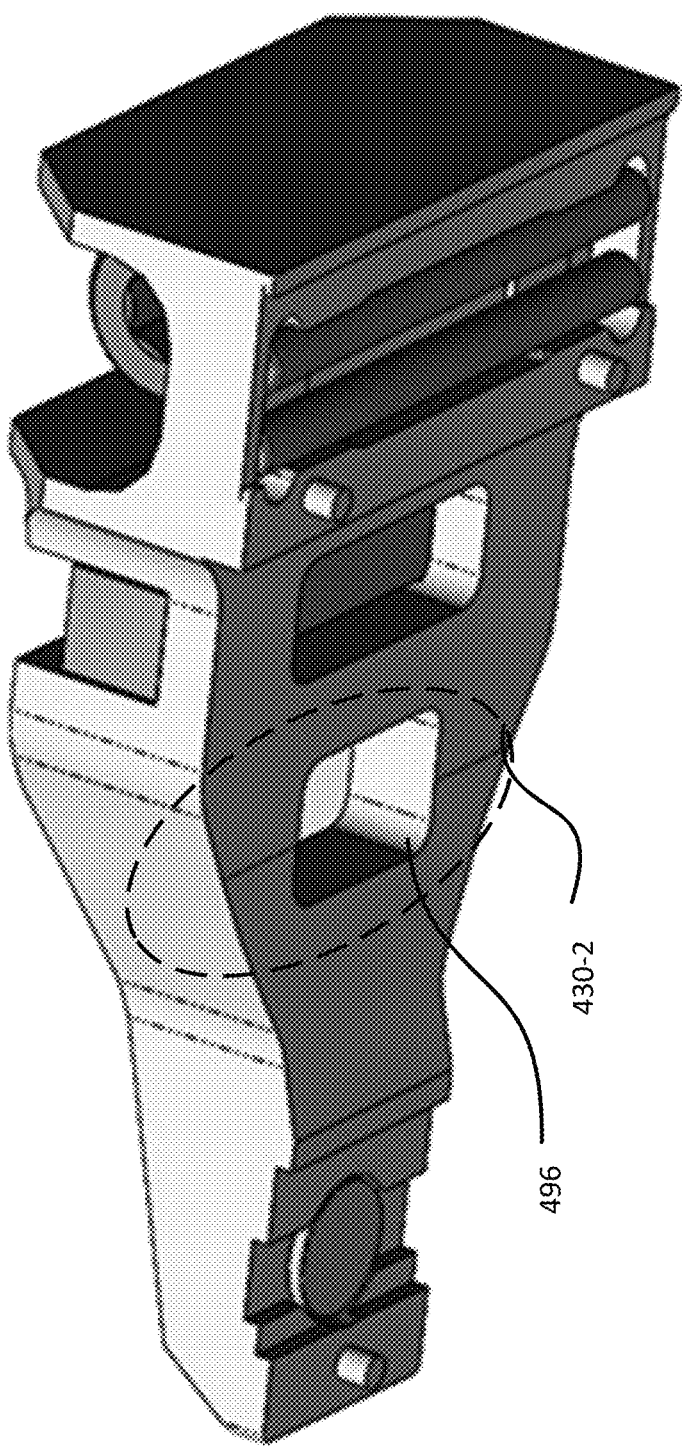
FIG. 4C illustrates a fixed carriage 451 of the guidance system of FIG. 4A in accordance with some embodiments.

FIG. 4A illustrates a guidance system 400 utilized in the HMD 101 of FIG. 1 in accordance with some embodiments. In some embodiments, the guidance system 400 is similar to guidance system 300 except that tandem retaining configuration 330 in the guidance system 400 has been replaced with a tandem retaining configuration 430 (illustrated in FIG. 4E) that includes a washer-based structure 495, a screw 431, a washer 432, and a screw slot 496. That is, in some embodiments, instead of the guidance system 400 using hook 371-1 and hook 371-2 of tandem retaining configuration 330 to prevent fixed carriage 351 from decoupling from movable carriage 352, the guidance system 400 uses the washer-based structure 495, the screw 431, the washer 432, and the screw slot 496 to prevent fixed carriage 451 from decoupling from a movable carriage 452. FIG. 4B illustrates the movable carriage 452 that includes the washer-based structure 495, the screw 431, and the washer 432 of the guidance system 400 of FIG. 4A in accordance with some embodiments. FIG. 4C illustrates a fixed carriage 451 that includes the screw slot 496 of guidance system 400 of FIG. 4A in accordance with some embodiments. In some embodiments, the screw slot 496 is a rectangular slot whose width and height are configured to allow the screw 431 to be screwed into the washer-based structure 495.

Figure 4D:
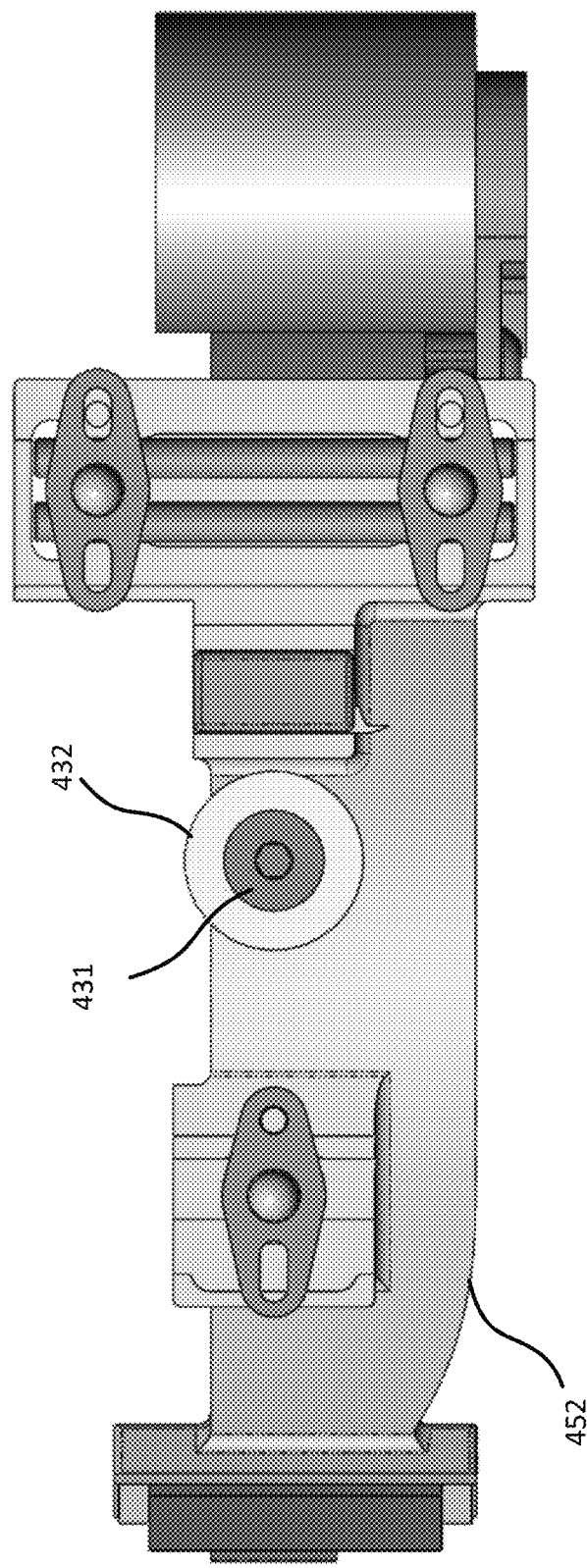
FIG. 4D is a diagram illustrating a top view of the movable carriage of FIG. 4B in accordance with some embodiments.
Figure 4E:
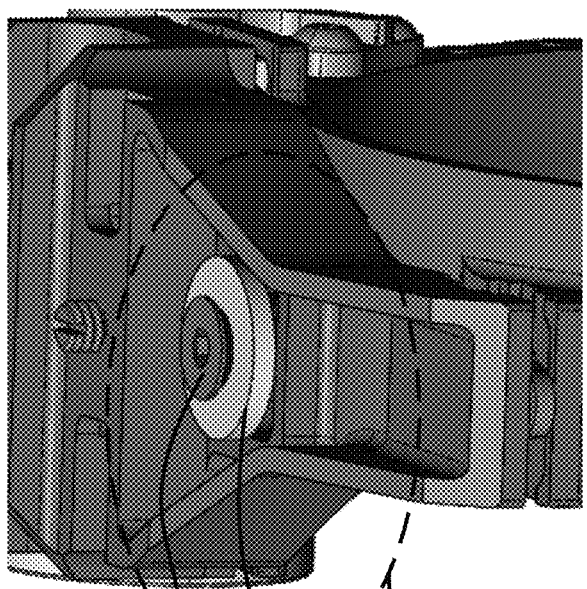
FIG. 4E is a diagram illustrating a tandem retaining configuration of the guidance system of FIG. 4A in accordance with some embodiments.

FIG. 4E is diagram illustrating a tandem retaining configuration 430 of the guidance system 400 in accordance with some embodiments. In some embodiments, tandem retaining configuration 430 of guidance system 400 includes a movable retaining configuration 430-1 of FIG. 4B and a fixed retaining configuration 430-2 of FIG. 4C. In some embodiments, the movable retaining configuration 430-1 includes the washer 432 and the screw 431. In some embodiments, the fixed retaining configuration 430-2 includes the screw slot 496. In some embodiments, the screw slot 496 is configured to allow the screw 431 to be screwed into the washer-based structure 495 as in FIG. 4C.

In some embodiments, as illustrated in FIG. 4E, the washer 432 and screw 431 fasten to movable carriage 452 to fixed carriage 451 while allowing movement of the movable carriage 452 along the optical axis 408. In some embodiments, the distance the movable carriage 452 is able to move along the optical axis 408 is limited by the width of the screw slot 496 along the optical axis 408. In some embodiments, the washer 432 and screw 431 fasten to movable carriage 452 to fixed carriage 451 to keep the fixed carriage 451 from decoupling from movable carriage 452. FIG. 4D is a diagram illustrating a top view of movable carriage guidance configuration 494 of FIG. 4C in more detail in accordance with some embodiments.

The ability of tandem retaining configuration 430 to limit movement of the fixed carriage 451 in the y-direction and prevent fixed carriage 451 from decoupling from movable carriage 452 allows the guidance system 400 to mitigate parasitic motion errors using the tandem retaining configuration 430 during operation of HMD 101.

Figure 5:
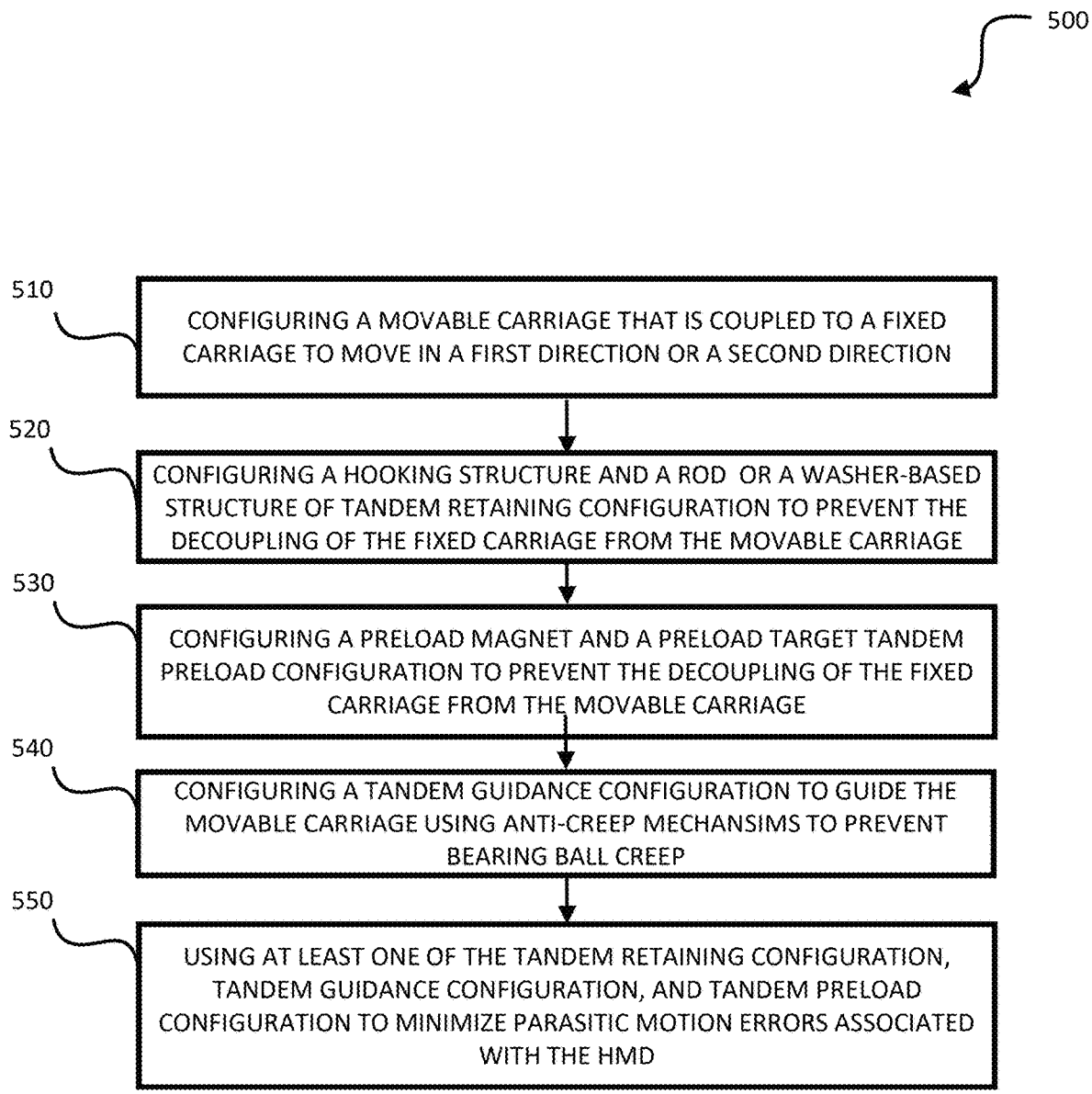
FIG. 5 is a flow diagram illustrating a method for using a guidance system to minimize parasitic motion errors in accordance with some embodiments.

FIG. 5 illustrates a method for using a guidance system to minimize parasitic motion errors in HMD 101 in accordance with some embodiments. The method, process steps, or stages illustrated in the figures may be implemented as an independent routine or process, or as part of a larger routine or process.

In some embodiments, at block 510, a movable carriage 352 that is coupled to fixed carriage 351 is configured to move in a first direction 368 and a second direction 359 in HMD 101. In some embodiments, in block 520, a hooking structure (e.g., hook 371-1, hook 371-2) and a rod (e.g., rod 383) or a washer-based structure (e.g., a washer-based structure 495) of a tandem retaining configuration 330 or tandem retaining configuration 430, respectively, is configured to prevent the decoupling of the fixed carriage 351 from the movable carriage 352. In some embodiments, a preload magnet 372 and a preload target 343 of tandem preload configuration 340 to prevent the decoupling of the fixed carriage 351 from the movable carriage 352. In some embodiments, at block 540, the tandem guidance configuration 320 is configured to utilize anti-creep mechanisms 341 to prevent ball bearing creep. In some embodiments, at block 550, at least one of the tandem guidance configuration 310, the tandem guidance configuration 320, the tandem retaining configuration 330, or the tandem preload configuration 340 is utilized to minimize parasitic motion error associated with the HMD 101.

In some embodiments, for purposes of the description, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure.

Hence, specific dimensions and other physical characteristics related to the embodiments or aspects disclosed herein are not to be considered as limiting. In some embodiments, the guidance system 300 is included in the varifocal actuation block 106 of HMD 101.

In some embodiments, one or more of the carriages (e.g., movable carriage 352 and fixed carriage 351) described herein may be rigid. In some examples, the length of the carriages may be fixed.

In accordance with some embodiments, a head-mounted display device includes one or more processors/cores and memory storing one or more programs configured to be executed by the one or more processors/cores. The one or more programs include instructions for performing the operations of any of the methods described herein. In accordance with some embodiments, a non-transitory computer-readable storage medium stores therein instructions that, when executed by one or more processors/cores of a head-mounted display device, cause the device to perform the operations of any of the methods described herein.

In another aspect, a head-mounted display device is provided and the head-mounted display device includes means for performing any of the methods described herein.

Thus, the disclosed embodiments provide a head-mounted display device with at least one voice coil motor to move a display of the head-mounted display device. A piezo-electric motor, or some other suitable motor, may in some embodiments, be used as an alternative to a voice coil motor.

In some embodiments, a system includes a movable carriage; and a fixed carriage coupled to the movable carriage, wherein the movable carriage and the fixed carriage utilize a magnetic preload configuration to prevent the fixed carriage from decoupling from the movable carriage.

In some embodiments of the system, the magnetic preload configuration includes a magnet and a preload target.

In some embodiments of the system, the magnet is coupled to the movable carriage and the preload target is coupled to the fixed carriage.

In some embodiments of the system, the fixed carriage is coupled to the movable carriage using an anchor pin.

In some embodiments of the system, the anchor pin is affixed to the fixed carriage.

In some embodiments of the system, the movable carriage and the fixed carriage utilize a retaining configuration to prevent the fixed carriage from decoupling from the movable carriage.

In some embodiments of the system, the retaining configuration includes a hooking structure that is utilized to prevent the fixed carriage from decoupling from the movable carriage.

In some embodiments of the system, the hooking structure includes a first hook and a second hook.

In some embodiments of the system, the hooking structure is coupled to a rod of the fixed carriage.

In some embodiments of the system, coupling the hooking structure to the rod of the fixed carriage prevents the decoupling of the fixed carriage from the movable carriage.

In some embodiments of the system, the retaining configuration includes a washer-based structure to prevent the fixed carriage from decoupling from the movable carriage.

In some embodiments of the system, the washer-based structure is a cylindrically shaped structure.

In some embodiments of the system, a combination of a hooking structure and the magnetic preload configuration prevent motion of the fixed carriage in a direction of the fixed carriage.

In some embodiments of the system, the movable carriage utilizes an anti-creep system to mitigate bearing ball creep associated with a plurality of bearing balls utilized to guide the movable carriage.

In some embodiments of the system, the anti-creep system includes a first anti-creep mechanism, a second anti-creep mechanism, and a third anti-creep mechanism to mitigate the bearing ball creep associated with the plurality of bearing balls.

In some embodiments of the system, the first anti-creep mechanism, the second anti-creep mechanism, and the third anti-creep mechanism are triangulated to mitigate the bearing ball creep associated with the plurality of bearing balls.

In some embodiments, a method includes configuring a movable carriage to move in a first direction or a second direction; and using at least one of a tandem retaining configuration, a tandem guidance system, and a tandem preload configuration to minimize parasitic motion errors associated with the movable carriage.

In some embodiments of the method, the tandem retaining configuration includes a hooking structure or a washer-based structure, the tandem guidance system includes an anti-creep system, and the tandem preload configuration includes a preload magnet and a preload target.

In some embodiments, a head-mounted display device includes an optics block; and a varifocal actuation system coupled to the optics block, wherein the varifocal actuation system utilizes at least one of a tandem retaining configuration, a tandem guidance system, and a tandem preload configuration to minimize parasitic motion errors associated with the head-mounted display device.

In some embodiments of the head-mounted display device, the tandem retaining configuration includes a hooking structure or a washer-based structure, the tandem guidance system includes an anti-creep system, and the tandem preload configuration includes a preload magnet and a preload target.

What is claimed is:

1. A system, comprising:
 a head-mounted display device comprising:
  an optics block comprising one or more lenses;
  a movable carriage fixedly coupled to the optics block; and
  a fixed carriage coupled to the movable carriage, wherein
  the movable carriage and the fixed carriage utilize a magnetic preload configuration to prevent the fixed carriage from decoupling from the movable carriage,
  the magnetic preload configuration includes a magnet and a preload target,
  the magnet is coupled to the movable carriage and the preload target is coupled to the fixed carriage, and
  the magnet and the preload target prevent the fixed carriage from decoupling from the movable carriage.

2. The system of claim 1, wherein: the fixed carriage is coupled to the movable carriage using an anchor pin.

3. The system of claim 2, wherein:
 the anchor pin is affixed to the fixed carriage.

4. The system of claim 1, wherein:
 the movable carriage and the fixed carriage utilize a retaining configuration to further prevent the fixed carriage from decoupling from the movable carriage.

5. The system of claim 4, wherein:
 the retaining configuration includes a hooking structure that is utilized to prevent the fixed carriage from decoupling from the movable carriage.

6. The system of claim 5, wherein:
the hooking structure includes a first hook and a second hook.

7. The system of claim 6, wherein:
the hooking structure is coupled to a rod of the fixed carriage.

8. The system of claim 7, wherein:
coupling the hooking structure to the rod of the fixed carriage prevents the decoupling of the fixed carriage from the movable carriage.

9. The system of claim 4, wherein:
the retaining configuration includes a washer-based structure to prevent the fixed carriage from decoupling from the movable carriage.

10. The system of claim 9, wherein:
the washer-based structure is a cylindrically shaped structure.

11. The system of claim 1, wherein:
a combination of a hooking structure and the magnetic preload configuration prevent motion of the fixed carriage in a direction of the fixed carriage.

12. The system of claim 1, wherein:
the movable carriage utilizes an anti-creep system to mitigate bearing ball creep associated with a plurality of bearing balls utilized to guide the movable carriage.

13. The system of claim 12, wherein:
the anti-creep system includes a first anti-creep mechanism, a second anti-creep mechanism, and a third anti-creep mechanism to mitigate the bearing ball creep associated with the plurality of bearing balls.

14. The system of claim 13, wherein:
the first anti-creep mechanism, the second anti-creep mechanism, and the third anti-creep mechanism are triangulated to mitigate the bearing ball creep associated with the plurality of bearing balls.

15. A method, comprising:
in a head-mounted device, configuring a movable carriage to move in a first direction or a second direction, the movable carriage fixedly coupled to an optics block comprising one or more lenses; and
in the head-mounted device, using at least one of a tandem retaining configuration, a tandem guidance system, and a tandem preload configuration to minimize parasitic motion errors associated with the movable carriage,
wherein the tandem preload configuration includes a magnet and a preload target, the magnet coupled to the movable carriage, and the preload target coupled to the fixed carriage, to prevent the fixed carriage from decoupling from the movable carriage.

16. The method of claim 15, wherein:
the tandem retaining configuration includes a hooking structure or a washer-based structure, and the tandem guidance system includes an anti-creep system.

17. A head-mounted display device, comprising:
an optics block comprising one or more lenses; and
a varifocal actuation system coupled to the optics block, wherein the varifocal actuation system utilizes at least one of a tandem retaining configuration, a tandem guidance system, and a tandem preload configuration to minimize parasitic motion errors associated with the head-mounted display device,
wherein the tandem preload configuration includes a magnet and a preload target, the magnet coupled to the movable carriage, and the preload target coupled to the fixed carriage, to prevent the fixed carriage from decoupling from the movable carriage.

18. The head-mounted display device of claim 17, wherein:
the tandem retaining configuration includes a hooking structure or a washer-based structure, and the tandem guidance system includes an anti-creep system.

\* \* \* \* \*